US012647736B2

(12) United States Patent
Xiao et al.

(10) Patent No.: US 12,647,736 B2
(45) Date of Patent: Jun. 2, 2026

(54) HEARING AIDS WITH ADJUSTABLE DIRECTIVITY

(71) Applicant: SHENZHEN SHOKZ CO., LTD., Shenzhen (CN)

(72) Inventors: Le Xiao, Shenzhen (CN); Xin Qi, Shenzhen (CN); Chenyang Wu, Shenzhen (CN); Fengyun Liao, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 162 days.

(21) Appl. No.: 18/337,416

(22) Filed: Jun. 19, 2023

(65) Prior Publication Data

US 2023/0336925 A1 Oct. 19, 2023

Related U.S. Application Data

(63) Continuation of application No. PCT/CN2022/079436, filed on Mar. 4, 2022.

(51) Int. Cl.

*H04R 25/00* (2006.01)
*H04R 1/10* (2006.01)
*H04R 1/40* (2006.01)

(52) U.S. Cl.

CPC ........... *H04R 25/405* (2013.01); *H04R 1/105* (2013.01); *H04R 1/406* (2013.01); *H04R 25/407* (2013.01); *H04R 2201/403* (2013.01)

(58) Field of Classification Search

CPC ...... H04R 25/405; H04R 1/105; H04R 1/406; H04R 25/407; H04R 2201/403

(Continued)

(56) References Cited

U.S. PATENT DOCUMENTS 4,773,095 A 9/1988 Zwicker et al.
6,339,758 B1 1/2002 Kanazawa et al.

(Continued)

FOREIGN PATENT DOCUMENTS

CN 101273618 B 6/2013
CN 103702258 B 2/2017

(Continued)

OTHER PUBLICATIONS

The Extended European Search Report in European Application No. 22902500.2 mailed on Mar. 13, 2024, 7 pages.

(Continued)

*Primary Examiner* — Norman Yu
(74) *Attorney, Agent, or Firm* — METIS IP LLC

(57) ABSTRACT

One or more embodiments of the present disclosure relates to hearing aids. A hearing aid includes a plurality of microphones configured to receive an initial sound signal and convert the initial sound signal into an electrical signal; a processor configured to process the electrical signal and generate a control signal; and a speaker configured to convert the control signal into a hearing aid sound signal. To process the electrical signal and generate the control signal, the processor is configured to: adjust a directivity of the initial sound signal received by the plurality of microphones, so that a sound intensity of a first sound signal from a direction of the speaker in the initial sound signal is always greater than or always less than a sound intensity of a second sound signal from other directions around.

18 Claims, 15 Drawing Sheets

(58) Field of Classification Search
USPC ......... 381/313, 92, 312, 60, 74, 56, 58, 107, 381/23.1, 356, 71.11, 73.1
See application file for complete search history.

(56) References Cited

U.S. PATENT DOCUMENTS

| | | | | |
|---|---|---|---|---|
| 9,992,585 | B1 | 6/2018 | Recker et al. | |
| 10,971,130 | B1 * | 4/2021 | Amengual Gari | H04R 3/005 |
| 11,809,774 | B1 * | 11/2023 | Vitt | H04R 1/1008 |
| 2002/0057817 | A1 | 5/2002 | Darbut | |
| 2003/0169891 | A1 * | 9/2003 | Ryan | H04R 1/08 381/313 |
| 2005/0084116 | A1 * | 4/2005 | Schulz | G01S 3/8083 381/91 |
| 2007/0076901 | A1 * | 4/2007 | Fischer | H04R 25/407 381/91 |
| 2010/0092016 | A1 | 4/2010 | Iwano et al. | |
| 2010/0150385 | A1 | 6/2010 | Sporer | |
| 2011/0150250 | A1 | 6/2011 | Pape et al. | |
| 2012/0195450 | A1 | 8/2012 | Foeh et al. | |
| 2013/0142356 | A1 * | 6/2013 | Isaac | H04R 3/005 381/92 |
| 2013/0301841 | A1 | 11/2013 | Sakuraba et al. | |
| 2014/0348360 | A1 | 11/2014 | Gran | |
| 2015/0003624 | A1 | 1/2015 | Sato | |
| 2015/0172815 | A1 | 6/2015 | Park et al. | |
| 2015/0281855 | A1 * | 10/2015 | Merks | H04R 25/50 381/313 |
| 2017/0339497 | A1 | 11/2017 | Merks | |
| 2018/0324511 | A1 | 11/2018 | Asada et al. | |
| 2019/0181823 | A1 * | 6/2019 | Pedersen | A61N 1/36038 |
| 2020/0329317 | A1 * | 10/2020 | Chiu | H04R 25/50 |
| 2021/0160608 | A1 | 5/2021 | Zhang et al. | |

FOREIGN PATENT DOCUMENTS

| | | | |
|---|---|---|---|
| CN | 106954166 | A | 7/2017 |
| CN | 104768104 | B | 11/2017 |
| CN | 211831068 | U | 10/2020 |
| EP | 2843971 | A1 | 3/2015 |
| EP | 3522568 | A1 | 8/2019 |
| JP | S617800 | A | 1/1986 |
| JP | 2005151292 | A | 6/2005 |
| JP | 2006109192 | A | 4/2006 |
| JP | 2007312050 | A | 11/2007 |
| JP | 2016127457 | A | 7/2016 |
| WO | 02085066 | A1 | 10/2002 |
| WO | 2018154143 | A1 | 8/2018 |

OTHER PUBLICATIONS

Notice of Reasons for Refusal in Japanese Application No. 2023-545349 mailed on Sep. 9, 2024, 14 pages.
Guo, Meng et al., Analysis of Acoustic Feedback/Echo Cancellation in Multiple-Microphone and Single-Loudspeaker Systems Using a Power Transfer Function Method, IEEE Transactions on Signal Processing, 59(12): 5774-5788, 2011.
Liang, Min et al., Technologies for Acoustic Feedback Control: State and Future, Digital Technology and Application, 59-75&78, 2012.
Henning Schepker et al., Combining Null-Steering and Adaptive Filtering for Acoustic Feedback Cancellation in a Multi-Microphone Earpiece, 25th European Signal Processing Conference, 231-235, 2017.
Zhao, Yingke et al., Experimental Study of Robust Beamforming Techniques for Acoustic Applications, IEEE Workshop on Applications of Signal Processing to Audio and Acoustics, 86-90, 2017.
Henning Schepker et al., Common Part Estimation of Acoustic Feedback Paths in Hearing Aids Optimizing Maximum Stable Gain, ICASSP, 649-653, 2015.
Henning Schepker et al., Acoustic Feedback Cancellation for a Multi-Microphone Earpiece Based on a Null-Steering Beamformer, IEEE, 2016, 5 pages.
Elior Hadad et al., Comparison of Two Binaural Beamforming Approaches for Hearing Aids, ICASSP, 236-240, 2017.
Linh Thi Thuc Tran et al., Two-Microphone Hearing Aids Using Prediction Error Method for Adaptive Feedback Control, IEEE/ACM Transactions on Audio, Speech, and Language Processing, 26(5): 909-923, 2018.
Henning Schepker et al., Null-Steering Beamformer-Based Feedback Cancellation for Multi-Microphone Hearing Aids with Incoming Signal Preservation, IEEE/ACM Transactions on Audio, Speech, and Language Processing, 27(4): 679-691, 2019.
Henning Schepker et al., Acoustic Feedback Suppression for Multi-Microphone Hearing Devices Using a Soft-Constrained Null-Steering Beamformer, IEEE/ACM Transactions on Audio, Speech, and Language Processing, 28: 929-940, 2020.
Notice of Reasons for Rejection in Japanese Application No. 2023545349 mailed on Feb. 4, 2025, 9 pages.
Notice of Reasons for Refusal in Japanese Application No. 2025092599 mailed on Mar. 24, 2026, 10 pages.

* cited by examiner

620

HEARING AIDS WITH ADJUSTABLE DIRECTIVITY

CROSS-REFERENCE TO RELATED APPLICATION

This application a Continuation of International Application No. PCT/CN2022/079436, filed on Mar. 4, 2022, the contents of which are entirely incorporated herein by reference.

TECHNICAL FIELD

The present disclosure relates to the field of acoustics, in particular to hearing aids.

BACKGROUND

In the field of hearing aids, an air conduction hearing aid or a bone conduction hearing aid is usually used to compensate for a hearing loss. The air conduction hearing aid amplifies air conduction sound signals by configuring an air conduction speaker to compensate for a hearing loss. The bone conduction hearing aid converts sound signals into vibration signals (a bone conduction sound) by configuring a bone conduction speaker to compensate for the hearing loss. As an amplified air conduction sound signal (even the bone conduction sound may have an air conduction leakage) is easily picked up again by a microphone of the hearing aid, the sound signals may form a closed signal loop, resulting in a signal oscillation, which appears as a hearing aid howling and affects the user's use.

SUMMARY

Some embodiments of the present disclosure provide a hearing aid, including: a plurality of microphones configured to receive an initial sound signal and convert the initial sound signal into an electrical signal; a processor configured to process the electrical signal and generate a control signal; a speaker configured to convert the control signal into a hearing aid sound signal. To process the electrical signal and generate the control signal, the processor is configured to: adjust a directivity of the initial sound signal received by the plurality of microphones, so that a sound intensity of a first sound signal from a direction of the speaker in the initial sound signal is always greater than or always less than a sound intensity of a second sound signal from other directions around.

In some embodiments, the hearing aid further includes: a supporting structure configured to set up on a user's head and accommodate the speaker, so that the speaker is located near the user's ear without blocking an ear canal.

In some embodiments, the plurality of microphones includes a first microphone and a second microphone that are spaced apart from the first microphone.

In some embodiments, a distance between the first microphone and the second microphone is within 5 mm-70 mm.

In some embodiments, an angle between a line connecting the first microphone and the second microphone and a line connecting the first microphone and the speaker is not greater than 30°, and the first microphone is farther away from the speaker relative to the second microphone.

In some embodiments, the first microphone, the second microphone and the speaker are arranged in line.

In some embodiments, the speaker is arranged on a midperpendicular line of the line connecting the first microphone and the second microphone.

In some embodiments, an adjusted directivity of the initial sound signal obtained after adjusting the directivity of the initial sound signal is a heart-like shape.

In some embodiments, a pole of the heart-like shape faces towards the speaker and a zero point of the heart-like shape faces away from the speaker.

In some embodiments, a zero point of the heart-like shape faces towards the speaker and a pole of the heart-like shape faces away from the speaker.

In some embodiments, an adjusted directivity of the initial sound signal obtained after adjusting the directivity of the initial sound signal is an 8-like shape.

In some embodiments, a distance between the first microphone and the speaker is not less than 5 mm, or a distance between the second microphone and the speaker is not less than 5 mm.

In some embodiments, the first microphone receives a first initial sound signal, the second microphone receives a second initial sound signal, and a distance between the first microphone and the speaker is different from a distance between the second microphone and the speaker.

In some embodiments, the processor is further configured to determine, based on the distance between the first microphone and the speaker and the distance between the second microphone and the speaker, a proportional relationship of the hearing aid sound signal in the first initial sound signal and second initial sound signal.

In some embodiments, the processor is further configured to: obtain a signal average power of the first initial sound signal and the second initial sound signal; and determine, based on the proportional relationship and the signal average power, the second sound signal in the initial sound signal from other directions around.

In some embodiments, the hearing aid further includes a filter configured to: feedback a portion of the electrical signal corresponding to the hearing aid sound signal to a signal processing loop to filter out the portion of the electrical signal corresponding to the hearing aid sound signal.

In some embodiments, the speaker includes an acoustic transducer, and the hearing aid sound signal includes a first air conduction sound wave generated by the acoustic transducer based on the control signal, the first air conduction sound wave being able to be heard by the user's ear.

In some embodiments, the speaker includes: a first vibration assembly electrically connected to the processor, the first vibration assembly being configured to receive the control signal, and generate a vibration based on the control signal; and a shell coupled with the first vibration assembly, the shell being configured to transmit the vibration to the user's face.

In some embodiments, the hearing aid sound signal comprises: a bone conduction sound wave generated based on the vibration, and/or a second air conduction sound wave generated by the first vibration assembly and/or the shell when generating and/or transmitting the vibration.

In some embodiments, the hearing aid further comprises: vibration sensors configured to obtain a vibration signal of the speaker; the processor is further configured to eliminate the vibration signal from the initial sound signal.

In some embodiments, the vibration sensors pick up the vibration from a location of the speaker to obtain the vibration signal.

In some embodiments, the vibration sensors pick up the vibration from a location of the speaker to obtain the vibration signal.

In some embodiments, a count of the vibration sensors is the same as a count of the plurality of microphones, each of the plurality of microphones corresponds to a vibration sensor, and the vibration sensors pick up the vibration from locations of each of the plurality of microphones to obtain the vibration signal.

In some embodiments, the vibration sensors comprise a sealed microphone, the sealed microphone including a sealed front cavity and a sealed rear cavity.

In some embodiments, the vibration sensors comprise a dual-communication microphone, a front cavity and a rear cavity of the dual-communication microphone includes a hole.

Some embodiments of the present disclosure provide a hearing aid, including: one or more microphones configured to receive an initial sound signal and convert the initial sound signal into an electrical signal; a processor configured to process the electrical signal and generate a control signal; a speaker configured to convert the control signal into a hearing aid sound signal. The one or more microphones include at least one directional microphone, and a directivity of the at least one directional microphone is a heart-like shape, so that a sound intensity of a first sound signal from a direction of a speaker in the initial sound signal is always greater than or always less than a sound intensity of a second sound signal from other directions around.

In some embodiments, the one or more microphones comprise a directional microphone, a zero point of the heart-like shape faces towards the speaker and a pole of the heart-like shape faces away from the speaker.

In some embodiments, the one or more microphones include a directional microphone and an omnidirectional microphone. a pole of the heart-like shape faces towards the speaker, and a zero point of the heart-like shape faces away from the speaker, or the zero point of the heart-like shape faces towards the speaker, and the pole of the heart-like shape faces away from the speaker.

In some embodiments, the one or more microphones include a first directional microphone and a second directional microphone, a directivity of the first directional microphone is a first heart-like shape, a directivity of the second directional microphone is a second heart-like shape. a pole of the first heart-like shape faces towards the speaker; a zero point of the first heart-like shape faces away from the speaker, a zero point of the second heart-like shape faces towards the speaker, and a pole of the second heart-like shape faces away from the speaker.

In some embodiments, the hearing aid further includes a filter configured to: feedback a portion of the electrical signal corresponding to the hearing aid sound signal to a signal processing loop to filter out the portion of the electrical signal corresponding to the hearing aid sound signal.

Some embodiments of the present disclosure provide a hearing aid, including: a first microphone configured to receive a first initial sound signal; a second microphone configured to receive a second initial sound signal; a processor configured to process the first initial sound signal and the second initial sound signal and generate a control signal; and a speaker configured to convert the control signal into a hearing aid sound signal. A distance between the first microphone and the speaker is different from a distance between the second microphone and the speaker.

In some embodiments, the distance between the second microphone and the speaker is not greater than 500 mm.

In some embodiments, the processor is further configured to: determine, based on the distance between the first microphone and the speaker, and the speaker the second microphone and the speaker, a proportional relationship of the hearing aid sound signal in the first initial sound signal and second initial sound signal.

In some embodiments, the processor is further configured to: obtain a signal average power of the first initial sound signal and the second initial sound signal; and determine, based on the proportional relationship and the signal average power, the second sound signal in the initial sound signal from other directions around.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
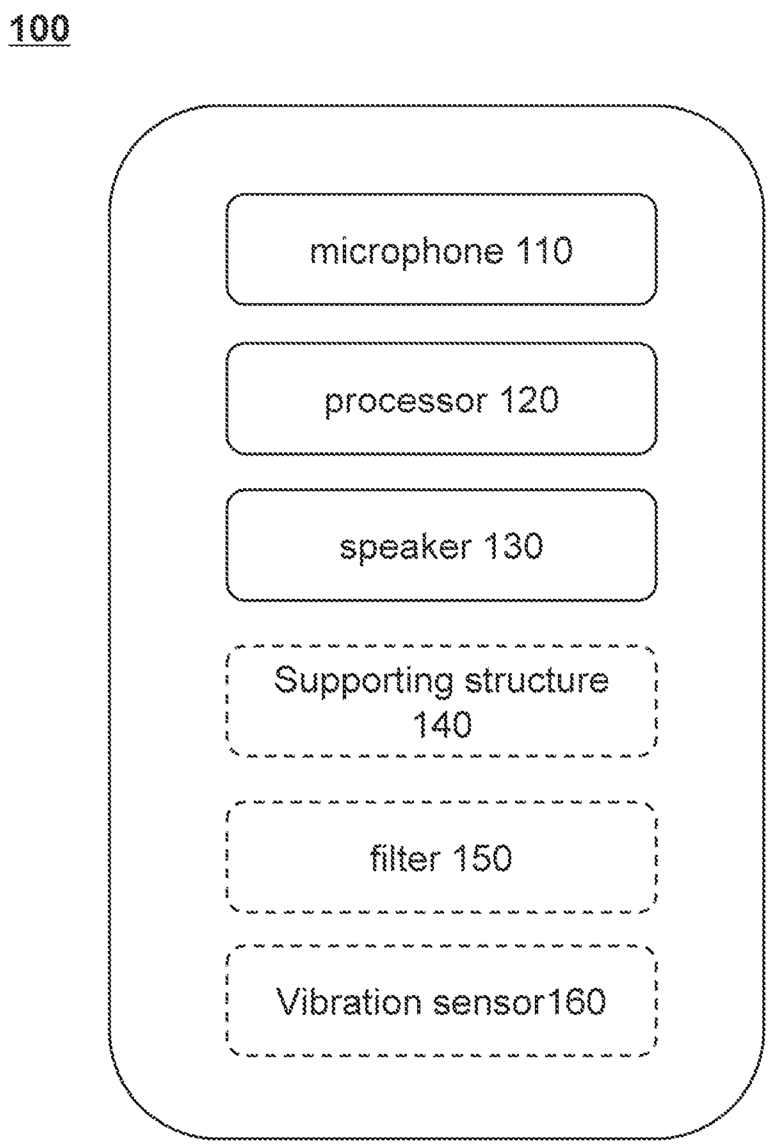
FIG. 1 is a structural block diagram illustrating an exemplary hearing aid according to some embodiments of the present disclosure.

In order to more clearly illustrate the technical solutions of the embodiments of the present disclosure, the following briefly introduces the drawings that need to be used in the description of the embodiments. Obviously, the accompanying drawings in the following description are only some examples or embodiments of the present disclosure, and those skilled in the art may further apply the present disclosure to other similar scenarios. Unless obviously obtained from the context or the context illustrates otherwise, the same numeral in the drawings refers to the same structure or operation.

It should be understood that “system,” “device,” “unit,” and/or “module” as used herein is a method for distinguishing different assemblies, elements, components, parts, or portions of different levels. However, the words may be replaced by other expressions if other words can achieve the same purpose.

As used in the disclosure and the appended claims, the singular forms “a,” “an,” and “the” include plural referents unless the content clearly dictates otherwise. Generally speaking, the terms “including,” and “comprising” only suggest the inclusion of clearly identified operations and elements, and these operations and elements do not constitute an exclusive list, and the method or device may further contain other operations or elements.

The flow chart is used in the present disclosure to illustrate the operations performed by the system according to the embodiment of the present disclosure. It should be understood that the preceding or following operations are not necessarily performed in the exact order. Instead, various operations may be processed in reverse order or simultaneously. At the same time, other operations may be added to these procedures, or a certain operation or operations may be removed from these procedures.

Hearing aids provided by the embodiment of the present disclosure may be applied to assist a hearing-impaired user to receive an external sound signal, and perform a hearing aid compensation for the hearing-impaired user. In some embodiments, the hearing aid may use an air conduction hearing aid or a bone conduction hearing aid to perform the hearing aid compensation for the hearing-impaired. The air conduction hearing aid amplifies an air conduction sound signal by configuring an air conduction speaker to compensate for a hearing loss. The bone conduction hearing aid converts a sound signal into a vibration signal (a bone conduction sound) by configuring a bone conduction speaker to compensate for the hearing loss. As the amplified air conduction sound signal (even the bone conduction sound may have an air conduction leakage) is easily picked up again by a microphone of the hearing aid, the sound signal forms a closed signal loop, resulting in a signal oscillation, which appears as a hearing aid howling and affects a user’s use.

In order to reduce or eliminate the howling generated by the hearing aid, the hearing aid provided by the embodiments of the present disclosure selectively collects a sound signal by setting a directivity of the microphone, so as to prevent the signal of the speaker from entering a signal processing loop again, thereby avoiding the howling of the hearing aid.

In some embodiments, a hearing aid may include a directional microphone. In some embodiments, by facing a zero point of the directional microphone toward the speaker, the sound signal from the speaker collected by the directional microphone may be reduced or avoided, thereby avoiding the howling. In some embodiments, the hearing aid may further include an omnidirectional microphone. In some embodiments, by facing a pole of the directional microphone toward the speaker, the directional microphone may mainly collect the sound signal from the speaker, and then remove the sound signal of the speaker from the sound signal collected by the omnidirectional microphone. As a result, the signal from the speaker may not enter the signal processing loop again, thereby avoiding the howling.

In some embodiments, the hearing aid may include a plurality of omnidirectional microphones. By setting positions of the plurality of omnidirectional microphones and processing the sound signal collected by the plurality of omnidirectional microphones, the plurality of omnidirectional microphones may be directional as a whole, so as to selectively collect the sound signal and prevent the signal of the speaker from entering the signal processing loop again, thereby avoiding the howling of the hearing aid.

FIG. 1 is an exemplary block diagram illustrating a hearing aid according to some embodiments according of the present disclosure.

A hearing aid 100 may include a microphone 100, a processor 120, and a speaker 130. In some embodiments, various assemblies in the hearing aid 100 (e.g., the microphone 110 and the processor 120, or the processor 120 and the speaker 130) may be connected to each other in a wired or wireless manner to realize a signal intercommunication.

In some embodiments, the microphone 110 may be configured to receive an initial sound signal and convert the initial sound signal into an electrical signal. The initial sound signal refers to a sound signal in any direction in the environment collected by the microphone (e.g., a user’s voice, a speaker’s voice). In some embodiments, the microphone 110 may include an air conduction microphone, a bone conduction microphone, a remote microphone, a digital microphone, etc., or any combination thereof. In some embodiments, the remote microphone may include a wired microphone, a wireless microphone, a broadcast microphone, etc., or any combination thereof. In some embodiments, the microphone 110 may pick up a sound transmitted by air. For example, the microphone 110 may convert a collected air vibration into an electrical signal. In some embodiments, a form of the electrical signal may include, but is not limited to, an analog signal or a digital signal.

In some embodiments, the microphone 110 may include an omnidirectional microphone and/or a directional microphone. The omnidirectional microphone refers to a microphone that collects the sound signal from all directions in a space. The directional microphone refers to a microphone that mainly collects the sound signal from a certain direction in the space, and a sensitivity of the sound signal collection is directional. In some embodiments, there may be one or more microphones 110. In some embodiments, when there are a plurality of microphones 110, there may be one or more types of microphones 110. For example, there may be two microphones 110, and the two microphones may both be the omnidirectional microphones. For another example, there may be two microphones 110, one of the two microphones may be the omnidirectional microphone, and the other may be the directional microphone. For another example, there may be two microphones 110, and both microphones may be the directional microphones. In some embodiments, when there is one microphone 110, the type of the microphone 110 may be the directional microphone. For more detailed contents about the microphone, please refer to the descriptions elsewhere in the present disclosure.

In some embodiments, the processor 120 may be configured to process the electrical signal and generate a control signal. The control signal may be configured to control the speaker 130 to output a bone conduction sound wave and/or an air conduction sound wave. In the embodiments of the present disclosure, the bone conduction sound wave refers to the sound wave (also known as "bone conduction sound") perceived by the user when a mechanical vibration is conducted to the user's cochlea through bones, and the air conduction sound wave (also known as "air conduction sound") refers to the sound wave perceived by the user when the mechanical vibration is conducted to the user's cochlea through air.

In some embodiments, the processor 120 may include an audio interface configured to receive the electrical signal (such as the digital signal or the analog signal) from the microphone 110. In some embodiments, the audio interface may include an analog audio interface, a digital audio interface, a wired audio interface, a wireless audio interface, etc., or any combination thereof.

In some embodiments, the processing of the electrical signal by the processor 120 may include adjusting a directivity of an initial sound signal received by the plurality of microphones, so that a sound intensity of a first sound signal from a direction of the speaker in the initial sound signal is always greater than or always less than a sound intensity of a second sound signal from other directions around. The sound from other directions around refers to the sound from non-speaker directions in the environment. For example, the sound from the user's direction. In some embodiments, the processing of the electrical signal by the processor 120 may further include calculating a portion of the electrical signal corresponding to the sound signal in the direction of the speaker, or calculating a portion of the electrical signal corresponding to the sound signal in the non-speaker direction. In some embodiments, the processor 120 may include a signal processing unit, and the signal processing unit may process the electrical signal.

In some embodiments, the plurality of microphones may include a first microphone and a second microphone, and the processor (such as the signal processing unit) may perform a time delay processing or a phase shift processing on the sound signal obtained by the first microphone. After that, a differential processing may be performed on the processed sound signal and the sound signal obtained by the second microphone to obtain a differential signal. The plurality of microphones may be directional by adjusting the differential signal. The plurality of microphones with directivity may make the sound intensity from the direction of the speaker in the initial sound signal always greater or always less than the sound intensity of the second sound signal from other directions around when receiving the initial sound signal. For more details about the directivity of a microphone, see the descriptions elsewhere in the present disclosure (e.g., FIGS. 3A-3D).

It should be understood that the processing of the sound signal or the vibration signal by the processor in the present disclosure means that the processor processes the electrical signal corresponding to the sound signal or the vibration signal, and a resulting signal obtained by these processes is also an electrical signal.

In some embodiments, the processor 120 may further amplify the processed electrical signal to generate the control signal. In some embodiments, the processor 120 may include a signal amplification unit configured to amplify the electrical signal to generate the control signal. In some embodiments, an order in which the signal processing unit and the signal amplification unit in the processor 120 process the electrical signal is not limited here. For example, in some embodiments, the signal processing unit may first process the electrical signal output by the microphone 110 into one or more signals, and then the signal amplification unit may amplify the one or more signals to generate the control signal. In other embodiments, the signal amplification unit may first amplify the electrical signal output by the microphone 110, and the signal processing unit may then process the amplified electrical signal to generate one or more control signals. In some embodiments, there may be a plurality of signal amplification units, and the signal processing unit may be located between the plurality of signal amplification units. For example, the signal amplification unit may include a first signal amplification unit and a second signal amplification unit, and the signal processing unit may be located between the first signal amplification unit and the second signal amplification unit. The electrical signal output by each of the plurality of microphones may first be amplified by the first signal amplification unit, and the signal processing unit may then process the amplified electrical signal to adjust the directivity of the initial sound signal received by the plurality of microphones. After that, the second amplification unit further amplifies the initial sound signal received by the plurality of directional microphones. In other embodiments, the processor 120 may only include the signal processing unit, and may not include the signal amplification unit.

In some embodiments, the control signal generated by the processor 120 may be transmitted to the speaker 130, and the speaker 130 may be configured to convert the control signal into a hearing aid sound signal. In some embodiments, the speaker may convert the control signal into different forms of hearing aid sound signals based on the type of the speaker. The type of the speaker may include, but are not limited to, an air conduction speaker, a bone conduction speaker, etc. Different forms of hearing aid sound signals may include the air conduction sound wave and/or the bone conduction sound wave.

In some embodiments, the speaker 130 may include an acoustic-electric transducer, and the hearing aid sound signal may include a first air conduction sound wave that can be heard by the user's ear generated by the acoustic-electric transducer based on the control signal (the speaker may be referred to as an "air conduction speaker"). The first air conduction sound wave refers to an air conduction sound wave generated by the acoustic-electric transducer based on the control signal.

In some embodiments, the speaker 130 may include a first vibration assembly and a shell. The first vibration assembly may be electrically connected to the processor. The first vibration assembly may be configured to receive the control signal, and generate a vibration based on the control signal. In some embodiments, the first vibration assembly may generate the bone conduction sound wave when vibrating (the speaker may be referred to as a "bone conduction speaker"), that is, the hearing aid signal may include the bone conduction sound wave generated based on the vibration of the first vibration assembly. In some embodiments, the first vibration assembly may be any element (e.g., a vibration motor, an electromagnetic vibration device, etc.) that converts the control signal into a mechanical vibration signal. Signal conversion modes may include but are not limited to: an electromagnetic (a dynamic coil type, a moving iron type, a magneto strictive type) type, a piezoelectric type, an electrostatic type, etc. An internal structure of the first vibration assembly may be a single resonant system or a composite resonant system. In some embodiments, when the user wears the hearing aid, a portion of the structure of the first vibration assembly may fit a skin of the user's head, so as to conduct the bone conduction sound wave to the user's cochlea through the user's skull. In some embodiments, the first vibration assembly may further transmit the vibration to the user's face through the shell coupled thereto. The shell refers to an enclosure and/or container that fixes or accommodates the first vibration assembly. In some embodiments, a material of the shell may be any one of polycarbonate, polyamide, and acrylonitrile-butadiene-styrene copolymer. In some embodiments, a coupling mode between the first vibration assembly and the shell include but not limited to a glue joint, a clip joint, etc.

In some embodiments, the first vibration assembly and/or the shell may push an air during the vibration to generate a second air conduction sound wave, that is, the hearing aid signal may include the second air conduction sound wave. In some embodiments, the second air conduction sound wave may be a leakage sound produced by the speaker.

In some embodiments, the first air conduction sound wave or the second air conduction sound wave generated by the speaker 130 may be collected by the microphone 110 of the hearing aid, and may be sent back to a signal processing loop for processing, thereby forming a closed signal loop. The closed signal loop may be expressed as the howling of the speaker of the hearing aid, which affects the user's use. In some embodiments, the howling of the speaker may be reduced or eliminated by adjusting the microphone to obtain the directivity of the initial sound signal by the processor. In some embodiments, when the speaker is the bone conduction speaker, the vibration signal generated by the speaker may be mixed into the initial sound signal and affect an accuracy of the processor 120 when adjusting the microphone 110 to obtain the directivity of the initial sound signal. Therefore, in some embodiments, the hearing aid may pick up the vibration signal received by the microphone 110 by setting a vibration sensor, and process the vibration signal through the processor to eliminate the impact of the vibration signal.

In some embodiments, the hearing aid 100 further may include a vibration sensor 160 configured to acquire the vibration signal of the speaker, and the processor may be further configured to eliminate the vibration signal from the initial sound signal.

In some embodiments, the vibration sensor 160 may be set at a position of the speaker, and obtain the vibration signal through a direct physical connection with the speaker. Then the processor may convert the vibration signal into the vibration signal at the position of the microphone through a conversion function (e.g., a transmission function), so that the vibration signal obtained by the vibration sensor is the same or approximately the same as the vibration signal obtained by the microphone. In some embodiments, the vibration sensor may further be disposed at the location of the microphone, and obtain the vibration signal through the direct physical connection with the microphone, so as to directly obtain the same or approximately the same vibration signal as the microphone. In some embodiments, the vibration sensor may further be indirectly connected to the speaker or the microphone through other solid media to obtain the vibration signal, and the vibration signal transmitted to the speaker or microphone may be transmitted to the vibration sensor through the solid media. In some embodiments, the solid media may be metal (e.g., a stainless steel, an aluminum alloy, etc.), non-metal (e.g., a wood, a plastic, etc.), etc.

In some embodiments, the processor may cancel the vibration signal from the initial sound signal based on a signal feature of the vibration signal. The signal feature refers to relevant information reflecting a feature of the signal. The signal feature may include, but not limited to, a combination of one or more of a count of peaks, a signal intensity, a frequency range, and a signal duration. The count of peaks refers to a count of amplitude intervals whose amplitude is greater than a preset value. The signal intensity refers to an intensity degree of the signal. In some embodiments, the signal intensity may reflect an intensity feature (e.g., an intensity of the user's speech, an intensity of the vibration of the first vibration assembly and/or the shell) of the initial sound signal and/or the vibration signal. In some embodiments, the greater the intensity of the user's speech and the greater the vibration of the first vibration assembly and/or the shell, the greater the intensity of the generated signal. A frequency component of the signal refers to distribution information of each frequency band in the initial sound signal and/or the vibration signal. In some embodiments, the distribution information of each frequency band may include, for example, a distribution of high-frequency signals, a distribution of mid-high frequency signals, a distribution of mid-frequency signals, a distribution of mid-low frequency signals, and a distribution of low-frequency signals. In some embodiments, the high frequency, the mid-high frequency, the mid-frequency, the mid-low frequency, and/or the low frequency may be manually defined. For example, the high-frequency signal may be a signal with a frequency greater than 4000 Hz. For another example, the mid-high frequency signal may be a signal with a frequency in a range of 2420 Hz-5000 Hz. For another example, the mid-frequency signal may be a signal with a frequency in the range of 1000 Hz-4000 Hz. For another example, the mid-high frequency signal may be a signal with a frequency in the range of 600 Hz-2000 Hz. The signal duration refers to a duration of an entire initial sound signal and/or the vibration signal or the duration of a single peak in the initial sound signal and/or the vibration signal. For example, the entire initial sound signal and/or the vibration signal may include 3 peaks, and the duration of the entire initial sound signal and/or vibration signal is 3 seconds.

In some embodiments, the vibration signal received by the vibration sensor 160 may be superimposed with a vibration noise signal received by the microphone after passing through an adaptive filter (also referred to as a first filter). The first filter may adjust the vibration signal received by the vibration sensor according to the superposition result (e.g., adjust the amplitude and/or a phase of the vibration signal), so that the vibration signal received by the vibration sensor and the vibration noise signal received by the microphone may cancel each other out, thereby eliminating the noise. In some embodiments, a parameter of the first filter is constant. For example, as factors such as a connection position and a connection mode of the vibration sensor and the microphone to the earphone shell are fixed, an amplitude-frequency response and/or a phase-frequency response of the vibration sensor and the microphone to the vibration may remain unchanged. Therefore, after being determined, the parameter of the first filter may be stored in a storage device (such as a signal processing chip), and may be directly used in the processor. In some embodiments, the parameter of the first filter is variable. During the noise elimination process, the first filter may adjust the parameter according to the signal received by the vibration sensor and/or the microphone, so as to eliminate the noise.

In some embodiments, the processor 120 may further use a signal amplitude modulation unit and a signal phase modulation unit instead of the first filter. After an amplitude modulation and a phase modulation, the vibration signal received by the vibration sensor may be canceled with the vibration signal received by the microphone, so as to eliminating the vibration signal. In some embodiments, neither the signal amplitude modulation unit nor the signal phase modulation unit is necessary, that is, the processor may be provided with only one signal amplitude modulation unit, or the processor may be provided with only one signal phase modulation unit.

Figure 6A:
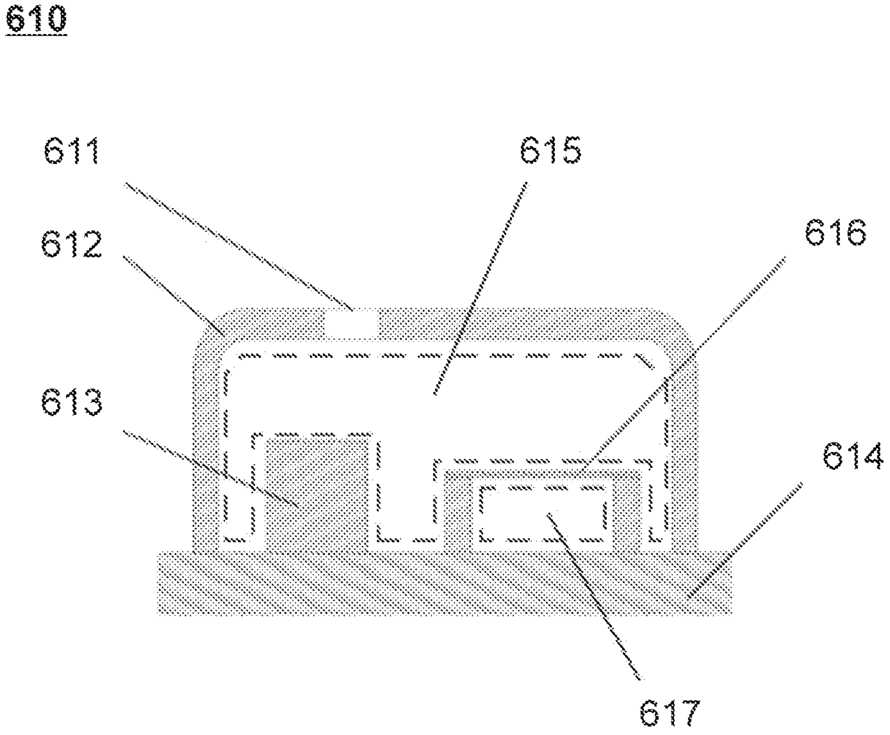
FIG. 6A is a schematic structural diagram illustrating an air conduction microphone according to some embodiments of the present disclosure.
Figure 6B:
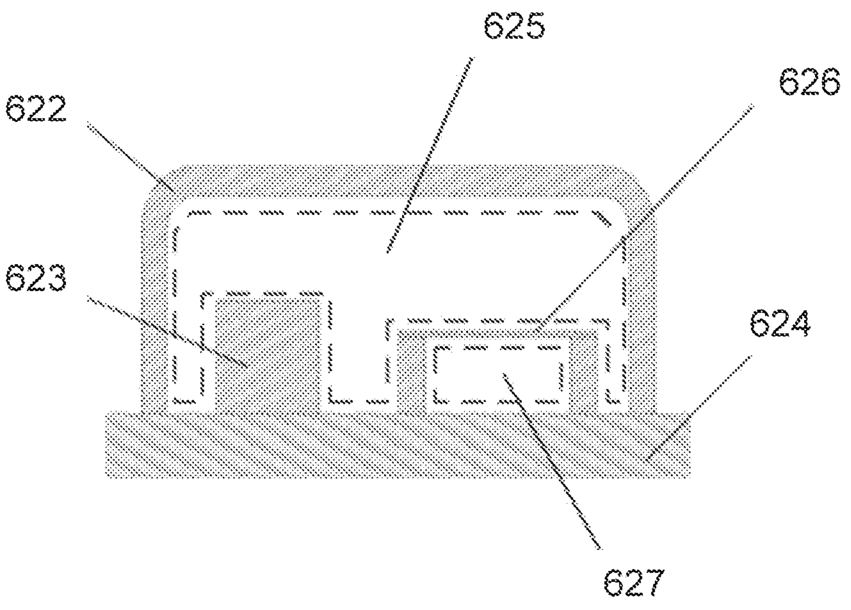
FIG. 6B is a schematic structural diagram illustrating a vibration sensor according to some embodiments of the present disclosure.
Figure 6C:
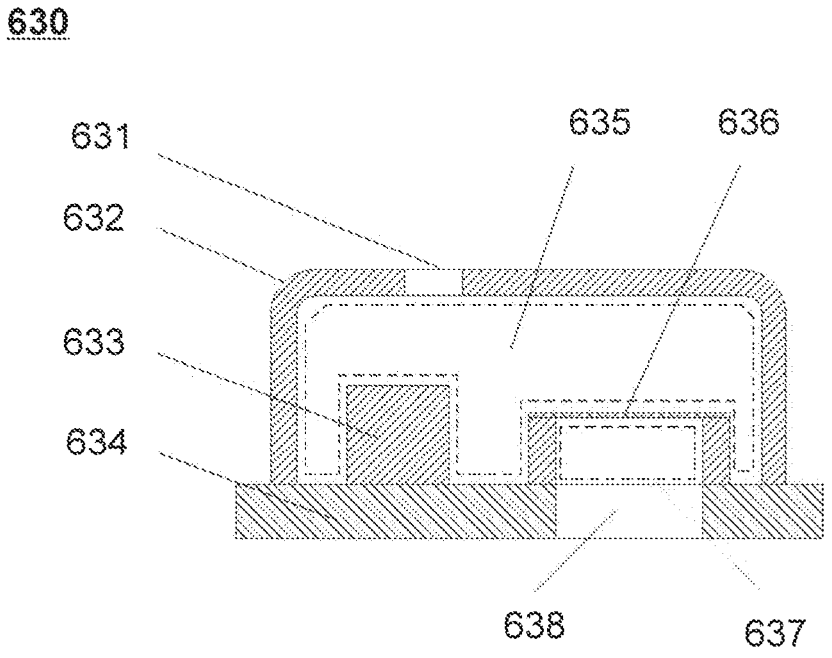
FIG. 6C is a schematic structural diagram illustrating a vibration sensor according to some other embodiments of the present disclosure.

For more description of the vibration sensor, please refer to FIGS. 6B-6C and the descriptions thereof.

In some embodiments, in order to further prevent the sound signal (i.e., the hearing aid signal) of the speaker from entering a signal processing loop again, the processor may further pre-process the electrical signal before generating the control signal. For example, a filtering, a noise reduction, etc., may be performed on the electrical signal.

In some embodiments, the hearing aid 100 may further include a filter 150 (also referred to as a second filter). In some embodiments, the filter 150 may be configured to filter out a portion of the electrical signal corresponding to the hearing aid sound signal. For more descriptions of the filter 150, please refer to FIG. 5 and the descriptions thereof.

In some embodiments, the hearing aid 100 may further include a supporting structure 140. In some embodiments, the supporting structure may be configured to be set up on the user's head. The supporting structure may carry the speaker so that the speaker is located near the user's ear without blocking the ear canal. In some embodiments, the supporting structure may be made of a softer material, so as to improve a wearing comfort of the hearing aid. In some embodiments, the material of the supporting structure may include polycarbonate (PC), polyamide (PA), acrylonitrile-butadiene styrene (ABS), polystyrene (PS), high impact polystyrene (HIPS), polypropylene (PP), polyethylene terephthalate (PET), Polyvinyl Chloride (PVC), polyurethane (PU), polyethylene (PE), phenolic formaldehyde (PF), urea-formaldehyde resin (UF), melamine-formaldehyde (MF), silicone, etc. or any combination thereof. For more details on the supporting structure 140, please refer to elsewhere in the present disclosure (e.g., FIGS. 2A-2D).

In order to describe the hearing aid more clearly, the following will be described in conjunction with FIGS. 2A-2D.

In some embodiments, as shown in FIGS. 2A-2D, a hearing aid 200 may include a first microphone 210, a second microphone 220, a speaker 230, a processor (not shown), and a supporting structure 240. In some embodiments, the supporting structure 240 may include an ear hook assembly 244 and at least one cavity. A cavity refers to a structure with an accommodation space inside. In some embodiments, the cavity may be configured to carry the microphone (e.g., the first microphone 210, the second microphone 220), the speaker (e.g., the speaker 230), and the processor. In some embodiments, the ear hook assembly may be physically connected to the at least one cavity, and may be configured to hang on an outside of the user's two ears respectively, so as to support the cavity (such as a first cavity 241) to carry the speaker at a position near the user's ear without blocking the ear canal. Thus, the user may be able to wear the hearing aid. In some embodiments, the ear hook assembly and the cavity may be connected by one or a combination of modes such as gluing, clamping, screwing or integral molding.

In some embodiments, a number of cavity may be one, and the first microphone 210, the second microphone 220, the speaker 230, and the processor may be all carried in one cavity. In some embodiments, the count of cavities may be multiple. In some embodiments, the cavity may include the first cavity 241 and a second cavity 242 separated from each other. It may be understood that more cavities may be provided in the supporting structure, for example, a third cavity, a fourth cavity, etc. In some embodiments, the first cavity 241 and the second cavity 242 may be connected or not. It should be noted that the speaker and the microphone are not limited to be located in the cavity. In some embodiments, all or a portion of the structure of the speaker and the microphone may be located on an outer surface of the supporting structure.

Figure 2A:
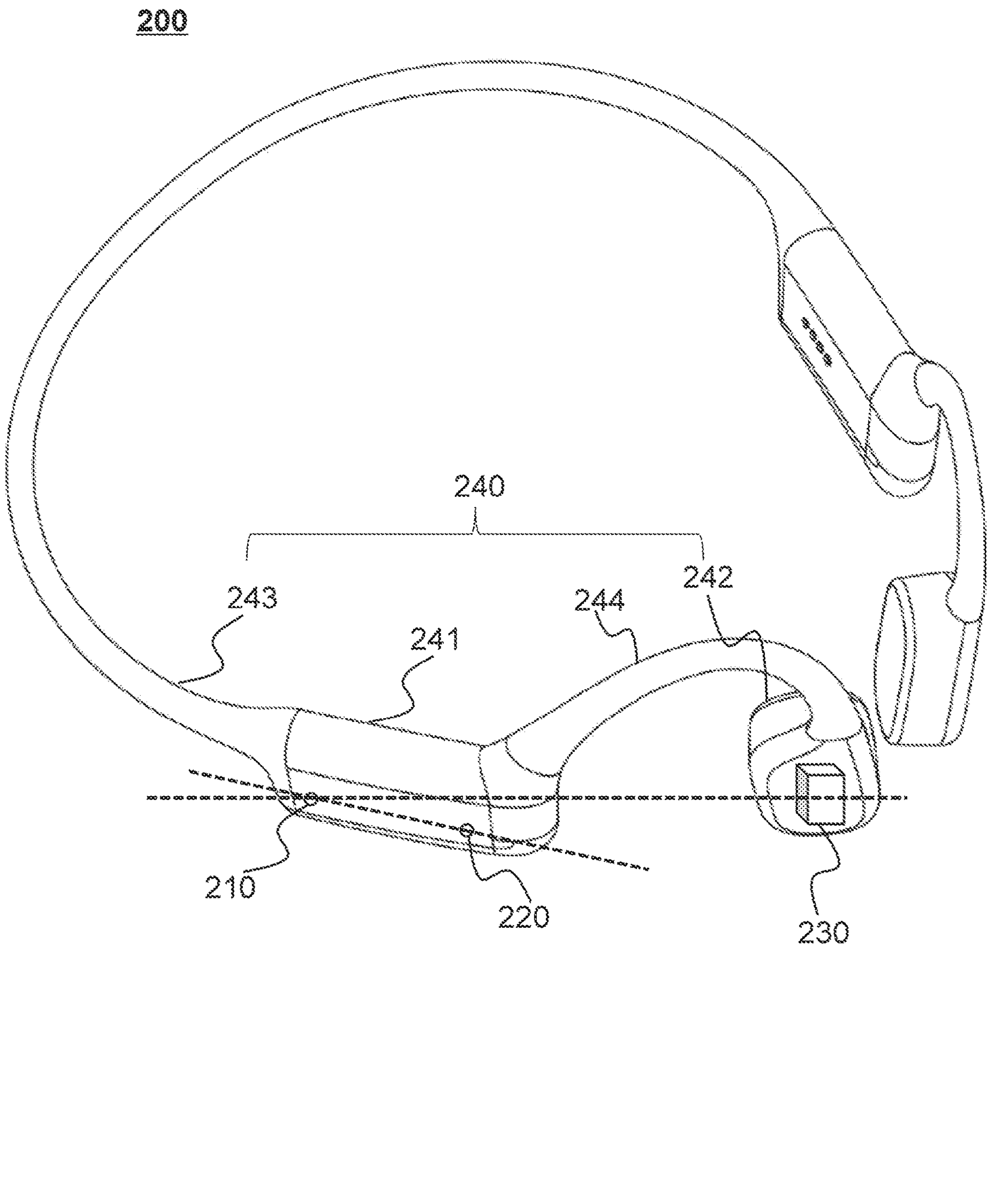
FIG. 2A is a schematic structural diagram illustrating a hearing aid according to some embodiments of the present disclosure.
Figure 2B:
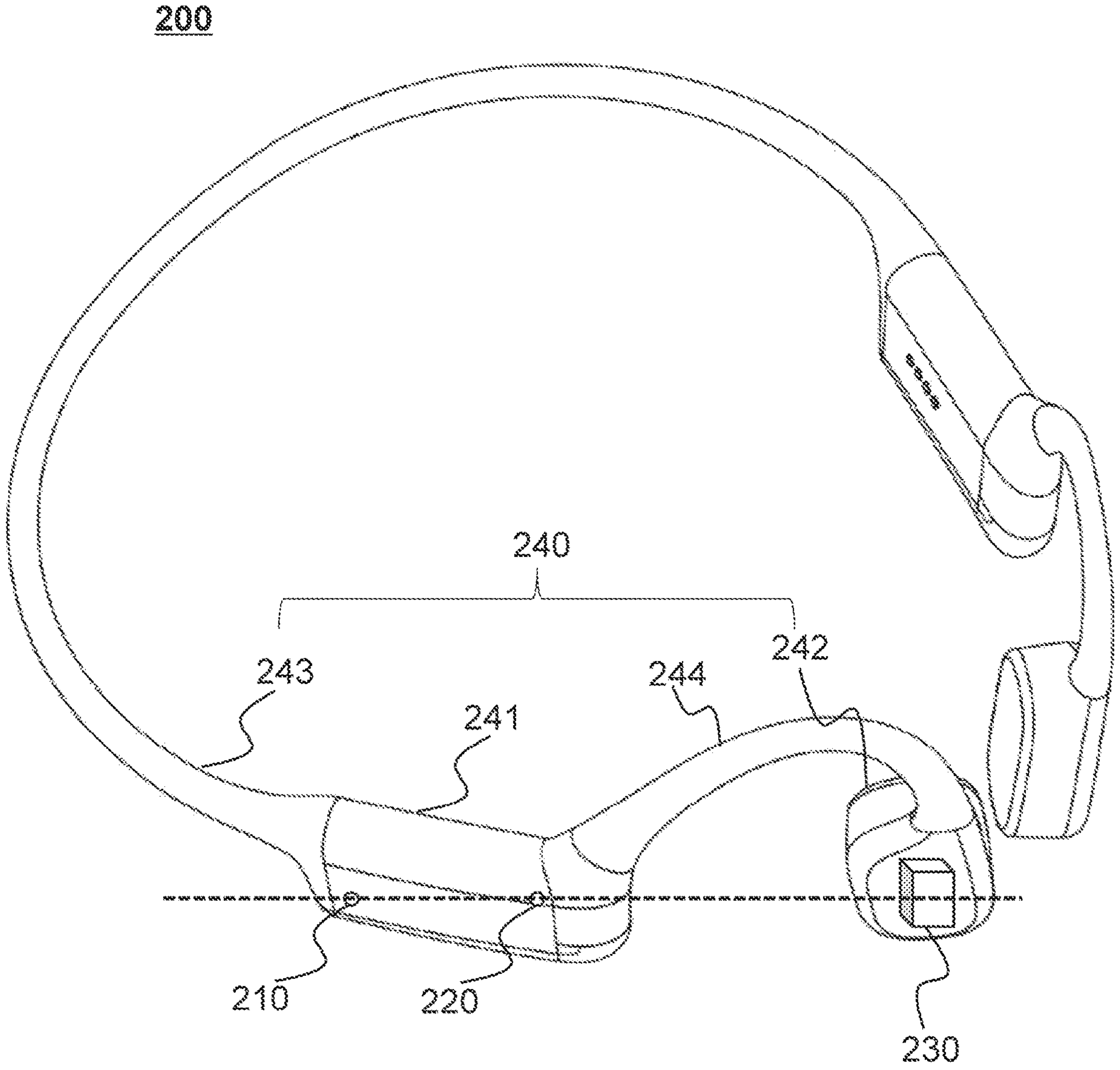
FIG. 2B is a schematic structural diagram illustrating a hearing aid according to some other embodiments of the present disclosure.
Figure 2C:
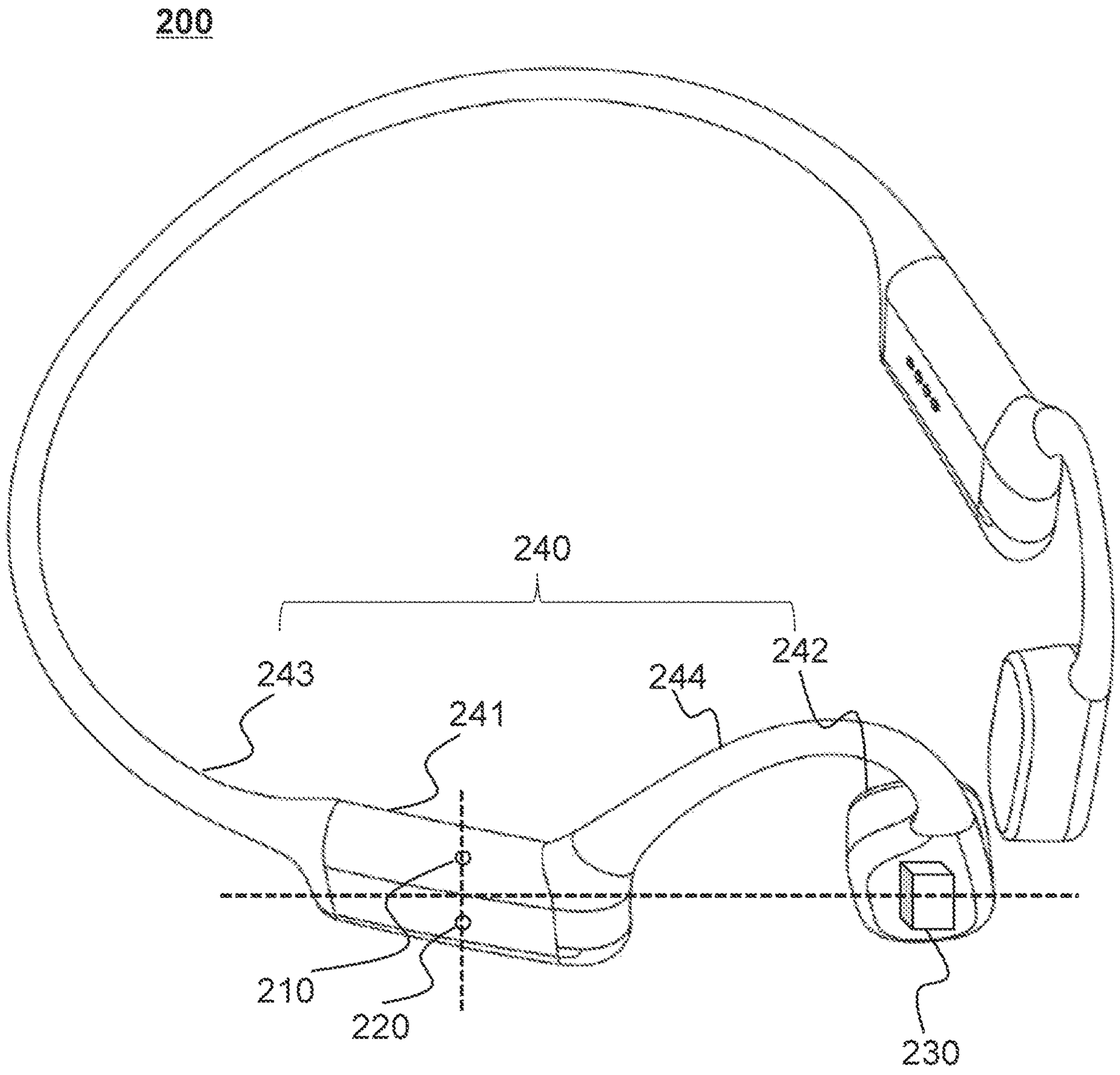
FIG. 2C is a schematic structural diagram illustrating a hearing aid according to some other embodiments of the present disclosure.

In some embodiments, in order to effectively solve the howling problem of the hearing aid, a distance between the microphone and the speaker or a position of the microphone relative to the user's auricle may be set so that the microphone collects as little sound as possible from the speaker. In some embodiments, a distance between the first microphone 210 and the speaker 230 may be not less than 5 mm, or a distance between the second microphone 220 and the speaker 230 may be not less than 5 mm. In some embodiments, the distance between the first microphone 210 and the speaker 230 may be not less than 5 mm, or the distance between the second microphone 220 and the speaker 230 may be not less than 30 mm. In some embodiments, the distance between the first microphone 210 and the speaker 230 may be not less than 5 mm, or the distance between the second microphone 220 and the speaker 230 may be not less than 35 mm. In some embodiments, the microphone and speaker may be disposed in different cavities. In some embodiments, as shown in FIGS. 2A-2C, the first microphone 210 and the second microphone 220 may be disposed in the first cavity 241, and the speaker 230 may be disposed in the second cavity 242. In some embodiments, the first cavity 241 and the second cavity 242 may be respectively located on front and rear sides of the user's auricle, so that the microphone and the speaker are respectively located on both sides of the user's auricle. The user's auricle may block a propagation of the air conduction sound wave, and increase an effective transmission path length of the air conduction sound wave, thereby reducing a volume of the air conduction sound wave received by the microphone. In some embodiments, as shown in FIGS. 2A-2C, the first cavity 241 and the second cavity 242 may be connected by an ear hook assembly 244. When the user wears the hearing aid 200, the ear hook assembly 244 may be near the user's auricle, so that the first cavity 241 is located on the rear side of the auricle, and the second cavity 242 is located on the front side of the auricle. The front side of the auricle refers to the side of the auricle facing a front side (e.g., a face of a person) of the human body. The rear side of the auricle refers to the side facing opposite to the front side, that is, the side of the auricle facing a rear side of the human body (e.g., the back of the head of a person). At this time, due to an existence of the user's auricle, the effective transmission path length of the air conduction sound wave generated by the speaker 230 to the microphone is increased, thereby reducing the volume of the air conduction sound wave received by the microphone, and effectively suppressing the howling of the hearing aid.

It should be noted that the positions of the microphone and the speaker are not limited to the aforementioned microphone being located on the rear side of the user's auricle, and the speaker being located on the front side of the user's auricle. For example, in some embodiments, the microphone may further be disposed on the front side of the user's auricle, and the speaker may be set on the rear side of the user's auricle. For another example, in some embodiments, when the user wears the hearing aid, the microphone and the speaker may further be disposed at the same side of the user's auricle (e.g., the front side of the auricle and/or the rear side of the auricle). It should be noted that the microphone and the speaker may be disused on the front side and/or the rear side of the user's auricle at the same time, and the position of the front side and/or the rear side here refer to the front side and/or the rear side of the user's auricle, or the position of the front side and/or the rear side may also refer to an oblique front and/or an oblique rear of the user's auricle. It should be noted that the microphone and the speaker may further be located at the same side of the user's auricle (e.g., the front side or the rear side of the user's auricle). In some embodiments, the microphone and the speaker may be located on both sides of the supporting structure. Further, when the speaker on one side of the supporting structure generates the air conduction sound wave or the bone conduction sound wave, the air conduction sound wave or the bone conduction sound wave need to bypass the supporting structure before transmitting to the microphone on the other side of the supporting structure. At this time, the supporting structure may further play a role in blocking or weakening the air conduction sound wave or the bone conduction sound wave.

In some embodiments, the processor may be located in the same cavity as the microphone or the speaker. For example, the processor, the first microphone 210, and the second microphone 220 are disposed in the first cavity 241. For another example, the processor and the speaker 230 are disposed in the second cavity 242. In some other embodiments, the processor and the microphone or the speaker may be disposed in different cavities. For example, the first microphone 210, the second microphone 220, and the speaker 230 are all disposed in the second cavity 242, and the processor is disposed in the first cavity 241.

Figure 2D:
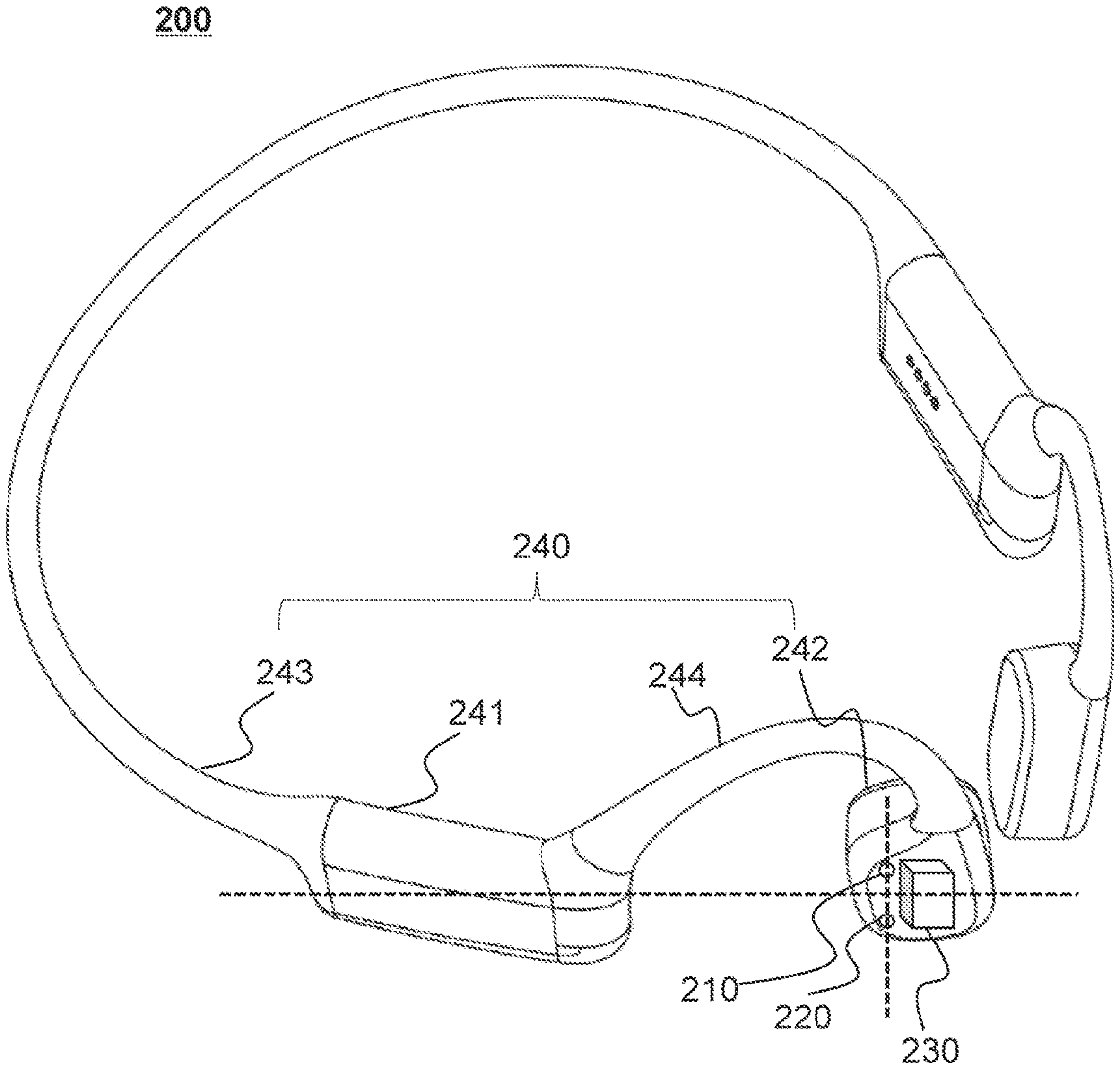
FIG. 2D is a schematic structural diagram illustrating a hearing aid according to some other embodiments of the present disclosure.

In some embodiments, the microphone and speaker may be located in the same cavity. For example, as shown in FIG. 2D, the first microphone 210, the second microphone 220, and the speaker 230 are all disposed in the second cavity 242. It may be understood that, in some other embodiments, the speaker 230 and the second microphone 220 may be disposed in the second cavity 242, and the first microphone 210 may be disposed in the first cavity 241. The first microphone 210, the second microphone 220, and the speaker 230 may all be disposed in the first cavity 241.

In some embodiments, a position between the microphone and the speaker, as well as a distance between the two microphones may be arranged to reduce the howling generated by the hearing aid. For example, in order to avoid an influence of the sound played by the speaker on the sound received by the microphone, the microphone may be disposed at a position away from the speaker. For example, if the speaker and the microphone are disposed in the same cavity and the speaker is disposed at an upper left corner of the cavity, then the microphone may be disposed at a lower right corner of the cavity.

In some embodiments, the supporting structure 240 may further include a rear hanging assembly 243 used to assist the user in wearing the hearing aid 200. In some embodiments, when the user wears the hearing aid 200, the rear hanging assembly 243 may be wound around a rear side of the user's head. In this way, when the hearing aid 200 is in a wearing state, the two ear hook assemblies 244 are respectively located on the left and right sides of the user's head. Under a cooperation of the two ear hook assemblies 244 and the rear hanging assembly 243, the cavity may clamp the user's head and be in contact with the user's skin, and then implement the sound transmission based on the air conduction technology and/or the bone conduction technology.

It should be noted that the speaker 230 shown in FIGS. 2A-2D may be a cuboid structure. In some embodiments, the speaker may further have other shape structures, such as a polygonal (regular and/or irregular) three-dimensional structure, a cylinder, a circular truncated cone, a vertebral body, and other geometric structures.

In some embodiments, as shown in FIG. 2A, the first microphone 210 and the second microphone 220 are disposed in the first cavity 241, and the speaker 230 is disposed in the second cavity 242. The processor may be disposed in the first cavity or the second cavity. In some embodiments, the plurality of microphones and speakers may not be collinearly disposed, that is, the first microphone 210, the second microphone 220, and the speaker 230 are not disposed on a straight line. In some embodiments, there may be a certain angle between a lines connecting the first microphone, the second microphone, and the speaker. In some embodiments, when the first microphone is farther away from the speaker relative to the second microphone, an angle between the line connecting the first microphone 210 and the second microphone 220 and the line connecting the first microphone 210 and the speaker 230 may be not greater than a preset angle threshold. In some embodiments, the angle threshold may be determined according to different requirements and/or functions. For example, the angle threshold may be 15°, 20°, 30°, etc. In some embodiments, in order to reduce the sound from the direction of the speaker in the initial sound signal as much as possible, the angle between the line connecting the first microphone 210 and the second microphone 220 and the line connecting the first microphone 210 and the speaker 230 is not greater than 30°. In some embodiments, the angle between the line connecting the first microphone 210 and the second microphone 220 and the line connecting the first microphone 210 and the speaker 230 is not greater than 25°. In some embodiments, the angle between the line connecting the first microphone 210 and the second microphone 220 and the line connecting the first microphone 210 and the speaker 230 is not greater than 20°.

In some embodiments, the distance between the first microphone, the second microphone, and the speaker may be limited according to different ways of setting the microphone and the speaker, so as to meet the requirement of reducing the howling.

In some embodiments, in order to facilitate the processing of the sound signals collected by the first microphone and the second microphone, referring to FIG. 2A, the microphone and the speaker are disposed in different cavities. When there is a certain angle between the line connecting the first microphone 210 and the second microphone 220 and the line connecting the first microphone 210 and the speaker 230 (e.g., the angle is greater than 0° and less than 30°), the distance between the first microphone 210 and the second microphone 220 may be 5 mm to 40 mm. In some embodiments, referring to FIG. 2A, the microphone and the speaker are disposed in different cavities, when the line connecting the first microphone 210 and the line connecting the first microphone 210 and the second microphone 220 has a certain angle (e.g., the angle is greater than 0° and less than 30°), the distance between the first microphone 210 and the second microphone 220 may be 8 mm to 30 mm. In some embodiments, referring to FIG. 2A, the microphone and the speaker are disposed in different cavities, when the line connecting the first microphone 210 and the second microphone 220 and the line connecting the first microphone 210 and the speaker 230 has a certain angle (e.g., the angle is greater than 0° and less than 30°), the distance between the first microphone 210 and the second microphone 220 may be 10 mm to 20 mm. In some embodiments, referring to FIG. 2A, the microphone and the speaker are disposed in different cavities, when the line connecting the first microphone 210 and the second microphone 220 and the line connecting the first microphone and the speaker 230 has a certain angle (e.g., the angle is greater than 0° and less than 30°), the distance between the first microphone 210 and the second microphone 220 may be 5 mm to 50 mm.

In some embodiments, a minimum distance between the microphone and the speaker may be limited, so as to prevent the speaker from being too close to the microphone and entering a directional area where the microphone collects the initial sound signal. In some embodiments, referring to FIG. 2A, the microphone and the speaker are disposed in different cavities, when the line connecting the first microphone 210 and the second microphone 220 and the line connecting the first microphone 210 and the speaker 230 has a certain angle (e.g., the angle is greater than 0° and less than) 30°, the distance between the first microphone 210 and the speaker 230 is not less than 30 mm, or the distance between the second microphone 220 and the speaker 230 is not less than 30 mm. In some embodiments, referring to FIG. 2A, the microphone and the speaker are disposed in different cavities, when the line connecting the first microphone 210 and the second microphone 220 and the line connecting the first microphone 210 and the speaker 230 has a certain angle (e.g., the angle is greater than 0° and less than) 30°, the distance between the first microphone 210 and the speaker 230 is not less than 30 mm, or the distance between the second microphone 220 and the speaker 230 is not less than 35 mm. In some embodiments, referring to FIG. 2A, the microphone and the speaker are disposed in different cavities, when the line connecting the first microphone 210 and the second microphone 220 and the line connecting the first microphone 210 and the speaker 230 has a certain angle (e.g., the angle is greater than 0° and less than) 30°, the distance between the first microphone 210 and the speaker 230 is not less than 30 mm, or the distance between the second microphone 220 and the speaker 230 is not less than 40 mm.

In some embodiments, as shown in FIG. 2B, the first microphone 210 and the second microphone 220 are disposed in the first cavity 241, and the speaker 230 is disposed in the second cavity 242. The processor may be disposed in the first cavity or the second cavity. In some embodiments, the first microphone 210, the second microphone 220 and the speaker 230 may be collinearly disposed. For example, as shown in FIG. 2B, the first microphone 210, the second microphone 220, and the speaker 230 may be disposed on a straight line.

In some embodiments, referring to FIG. 2B, the microphone and the speaker are disposed in different cavities. When the first microphone 210, the second microphone 220, and the speaker 230 are collinearly disposed, the distance between the first microphone 210 and the second microphone 220 may be 5 mm to 40 mm. In some embodiments, when the first microphone 210, the second microphone 220, and the speaker 230 are collinearly disposed, the distance between the first microphone 210 and the second microphone 220 may be set in a mode referring to FIG. 2A.

In some embodiments, referring to FIG. 2B, the microphone and the speaker are disposed in different cavities. When the first microphone 210, the second microphone 220 and the speaker 230 are collinearly disposed, the distance between the first microphone 210 and the speaker 230 is not less than 30 mm, or the distance between the second microphone 220 and the speaker 230 is not less than 30 mm. In some embodiments, when the first microphone 210, the second microphone 220, and the speaker 230 are collinearly disposed, a minimum distance between the first microphone 210 and the second microphone 220 may be disposed as shown in FIG. 2A.

In some embodiments, as shown in FIG. 2C, the first microphone 210 and the second microphone 220 are disposed in the first cavity 241, and the speaker 230 is disposed in the second cavity 242. In some embodiments, the speaker may be disposed on a midperpendicular line of the line connecting the first microphone and the second microphone.

In some embodiments, referring to FIG. 2C, the microphone and the speaker are disposed in different cavities. When the speaker 230 is disposed on the midperpendicular line of the line connecting the first microphone 210 and the second microphone 220, the distance between the first microphone 210 and the speaker 230 may be 5 mm-35 mm, or the distance between the second microphone 220 and the speaker 230 may be 5 mm-35 mm. In some embodiments, referring to FIG. 2C, the microphone and the speaker are disposed in different cavities. When the speaker 230 is disposed on the midperpendicular line of the line connecting the first microphone 210 and the second microphone 220, the distance between the first microphone 210 and the speaker 230 may be 8 mm-30 mm, or the distance between the second microphone 220 and the speaker 230 may be 8 mm-30 mm. In some embodiments, referring to FIG. 2C, the microphone and the speaker are disposed in different cavities. When the speaker 230 is disposed on the midperpendicular line of the line connecting the first microphone 210 and the second microphone 220, the distance between the first microphone 210 and the speaker 230 may be 10 mm-25 mm, or the distance between the second microphone 220 and the speaker 230 may be 10 mm-25 mm.

In some embodiments, in order to prevent the speaker from being too close to the microphone and entering the directional area where the microphone collects the initial sound signal, referring to FIG. 2C, the microphone and the speaker are disposed in different cavities. When the speaker 230 is disposed on the midperpendicular line of the line connecting the first microphone 210 and the second microphone 220, the distance between the first microphone 210 and the speaker 230 may be no less than 30 mm, or the distance between the second microphone 220 and the speaker 230 may be no less than 30 mm. In some embodiments, referring to FIG. 2C, the microphone and the speaker are disposed in different cavities. When the speaker 230 is disposed on the midperpendicular line of the line connecting the first microphone 210 and the second microphone 220, the distance between the first microphone 210 and the speaker 230 may be no less than 35 mm, or the distance between the second microphone 220 and the speaker 230 may be no less than 35 mm. In some embodiments, referring to FIG. 2C, the microphone and the speaker are disposed in different cavities. When the speaker 230 is disposed on the midperpendicular line of the line connecting the first microphone 210 and the second microphone 220, the distance between the first microphone 210 and the speaker 230 may be no less than 40 mm, or the distance between the second microphone 220 and the speaker 230 may be no less than 40 mm.

It should be noted that the speaker 230 may further be slightly deviated from the midperpendicular line of the line connecting the first microphone 210 and the second microphone 220, instead of being strictly disposed on the midperpendicular line. For example, the line connecting a midpoint of the line connecting the first microphone 210 and the second microphone 220 and speaker 230 may not be strictly perpendicular to the line connecting the first microphone 210 and the second microphone 220. An angle between the two lines (i.e. the line between connecting the midpoint and the speaker, and the line connecting the first microphone and the second microphone) only needs to be within a range of 70°~110°.

In some embodiments, as shown in FIG. 2D, the first microphone 210, the second microphone 220, and the speaker 230 are all disposed in the second cavity 242. In some embodiments, the speaker 230 may be disposed on the midperpendicular line of the line connecting the first microphone 210 and the second microphone 220. In some embodiments, when the first microphone 210, the second microphone 220, and the speaker 230 are all disposed in the second cavity 242, the supporting structure 240 may only be provided with the second cavity 242 without the first cavity 241. In some embodiments, when the first microphone 210, the second microphone 220, and the speaker 230 are all disposed in the second cavity 242, the supporting structure 240 may further be provided with the first cavity 241 and the second cavity 242 at the same time. The first cavity 241 may be used for carrying the processor or disposing control buttons for controlling the hearing aid 200.

In some embodiments, when the first microphone 210, the second microphone 220, and the speaker 230 are all disposed in the second cavity 242, the distance between the first microphone 210 and the second microphone 220 may be 5 mm to 40 mm. In some embodiments, when the first microphone 210, the second microphone 220, and the speaker 230 are all disposed in the second cavity 242, the distance between the first microphone 210 and the second microphone 220 may be 8 mm to 30 mm. In some embodiments, when the first microphone 210, the second microphone 220, and the speaker 230 are all disposed in the second cavity 242, the distance between the first microphone 210 and the second microphone 220 may be 10 mm to 20 mm. In some embodiments, when the first microphone 210, the second microphone 220, and the speaker 230 are all disposed in the second cavity 242, the distance between the first microphone 210 and the speaker 230 may be disposed to be no less than 5 mm, or the distance between the second microphone 220 and the speaker 230 may be disposed to be no less than 5 mm. In some embodiments, when the first microphone 210, the distance between the first microphone 210 and the speaker 230 may be disposed to be no less than 6 mm, or the distance between the second microphone 220 and the speaker 230 may be disposed to be no less than 6 mm. In some embodiments, when the first microphone 210, the distance between the first microphone 210 and the speaker 230 may be disposed to be no less than 8 mm, or the distance between the second microphone 220 and the speaker 230 may be disposed to be no less than 8 mm.

Figure 2E:
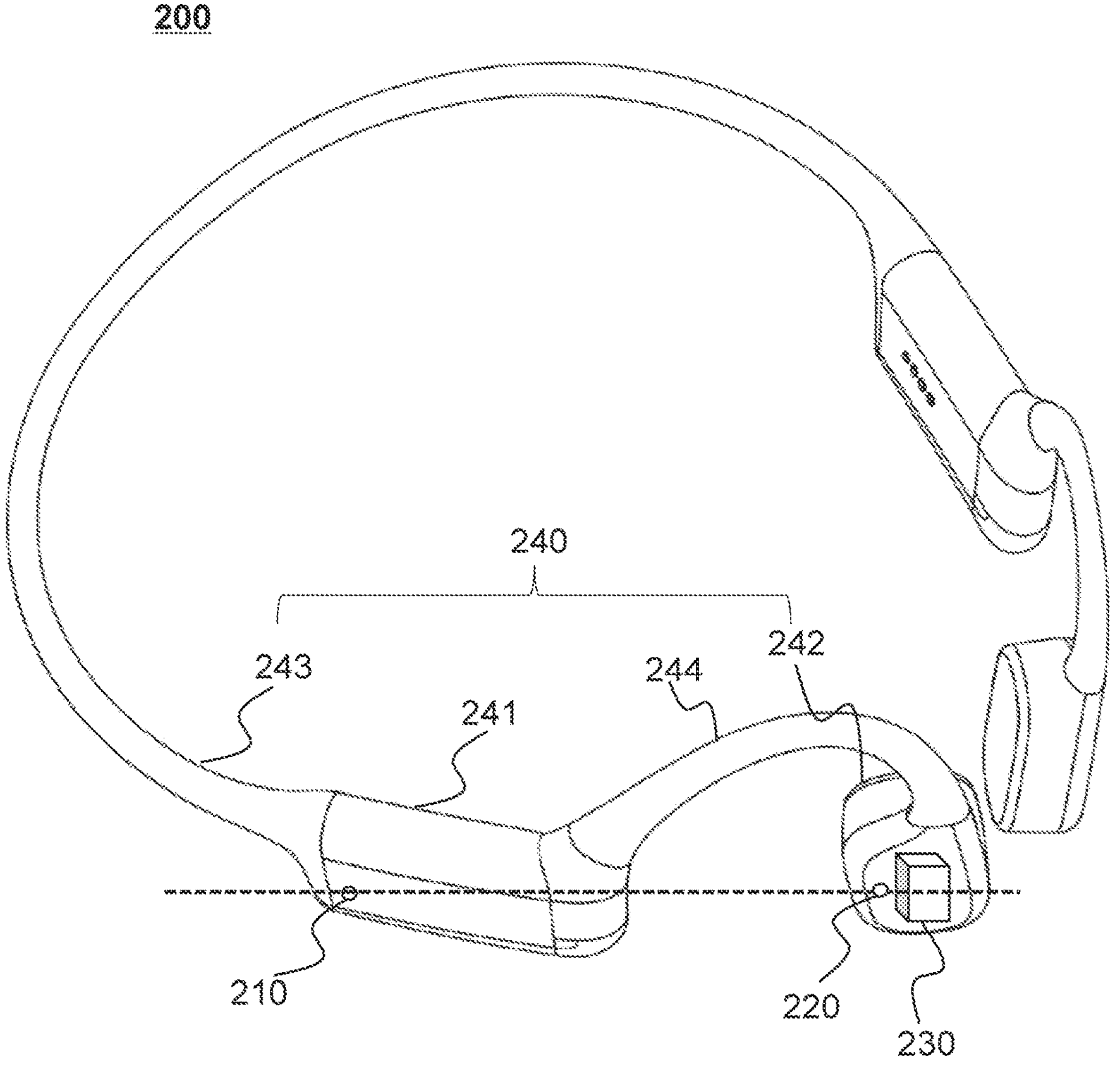
FIG. 2E is a schematic structural diagram illustrating a hearing aid according to some other embodiments of the present disclosure.

It may be understood that the first microphone 210, the second microphone 220, and the speaker 230 shown in FIGS. 2A-2C may further be disposed in the same cavity (e.g., the second cavity 242). The positions of the microphone and the speaker may be disposed with reference to FIGS. 2A-2C. Similarly, the positions of the microphone and the speaker may be disposed in other way, as long as a delay difference and an amplitude difference between the hearing aid signals of the speaker received by the two microphones can be measured. For example, the first microphone 210 and the second microphone 220 may be disposed in different cavities. In some embodiments, referring to FIG. 2E, the first microphone 210 is disposed in the first cavity 241, and the second microphone 220 and the speaker 230 are disposed in the second cavity 242. In some embodiments, when the first microphone 210 and the second microphone 220 are disposed in different cavities, the first microphone 210, the second microphone 220, and the speaker 230 may be disposed on a straight line. In some embodiments, when the first microphone 210 and the second microphone 220 are disposed in different cavities, the first microphone 210, the second microphone 220, and the speaker 230 may not be disposed in a straight line, and there may be a certain angle between the line connecting the second microphone and the speaker, and the line connecting the second microphone and the speaker. The angle may be no greater than 30°. In some embodiments, when the first microphone 210 and the second microphone 220 are disposed in different cavities, the distance between the first microphone 210 and the second microphone 220 may be 30 mm to 70 mm. In some embodiments, when the first microphone 210 and the second microphone 220 are disposed in different cavities, the distance between the first microphone 210 and the second microphone 220 may be 35 mm to 65 mm. In some embodiments, when the first microphone 210 and the second microphone 220 are disposed in different cavities, the distance between the first microphone 210 and the second microphone 220 may be 40 mm to 60 mm. In some embodiments, when the first microphone 210 and the second microphone 220 are disposed in different cavities, the distance between the first microphone 210 and the speaker 230 is not less than 5 mm, or the distance between the second microphone 220 and the speaker 230 is not less than 5 mm. In some embodiments, when the first microphone 210 and the second microphone 220 are disposed in different cavities, the distance between the first microphone 210 and the speaker 230 is not less than 6 mm, or the distance between the second microphone 220 and the speaker 230 is not less than 6 mm. In some embodiments, when the first microphone 210 and the second microphone 220 are disposed in different cavities, the distance between the first microphone 210 and the speaker 230 is not less than 8 mm, or the distance between the second microphone 220 and the speaker 230 is not less than 8 mm In some embodiments, a first microphone 310 and a second microphone 320 are omnidirectional microphones, and the processor 120 may adjust the directivity of the initial sound signal received by the plurality of microphones, so that the adjusted initial sound signal has a specific shape. For example, a heart-like shape, an 8-like shape, a super heart-like shape, etc. In some embodiments, after being adjusted by the processor, the directivity of the initial sound signal received by the plurality of microphones may be the heart-like shape. The heart-like shape refers to a pattern similar to or close to a heart shape. In some embodiments, after being adjusted by the processor, the directivity of the initial sound signal received by the plurality of microphones may present the 8-like shape. The 8-like shape referred to a shape similar to or close to the number 8.

In some embodiments, the sound signal received by the first microphone 310 may be a first initial sound signal, and the sound signal received by the second microphone 320 may be a second initial sound signal. In some embodiments, the processor may process the first initial sound signal and the second initial sound signal to adjust the directivity of the initial sound signals received by the plurality of microphones. The first initial sound signal refers to a sound signal received by the first microphone from any direction in the environment. The second initial sound signal refers to a sound signal received by the second microphone from any direction in the environment.

In some embodiments, the processor 120 may adjust the directivity of the initial sound signal received by the plurality of microphones through the following process.

The processor 120 may convert the first initial sound signal into a first frequency domain signal, and convert the second initial sound signal into a second frequency domain signal. The processor 120 may calculate, according to the positions of the first microphone 310 and the second microphone 320 and/or a distance between the first microphone 310 and the second microphone 320, directivity data toward a speaker 330 and the directivity data away from the speaker in the first frequency domain signal and the second frequency domain signal. In some embodiments, the processor may perform a phase transformation on the second frequency domain signal according to sampling frequencies of the first initial sound signal and the second initial sound signal as well as the positions of the first microphone and the second microphone and/or the distance between the first microphone and the second microphone, so that the second frequency domain signal may have the same phase with the first frequency domain signal. Then, the directivity data toward the speaker may be obtained by subtracting the first frequency domain signal from the second frequency domain signal after the phase transformation. In this way, the plurality of microphones may have the directivity toward the speaker, the directivity may be the heart-like shape, and a pole of the heart-like shape may face towards the speaker. In some embodiments, the processor may further perform a phase transformation on the first frequency domain signal according to the sampling frequencies of the first initial sound signal and the second initial sound signal as well as the positions of the first microphone and the second microphone and/or the distance between the first microphone and the second microphone, so that the first frequency domain signal may have the same phase with the second frequency domain signal. Then, the directivity data away from the speaker may be obtained by subtracting the first frequency domain signal after the phase transformation from the second frequency domain signal. In this manner, the plurality of microphones may have the directivity away from the direction of the speaker. The directivity may be the heart-like shape, and the pole of the heart-like shape may face away from the direction of the speaker. In some embodiments, the processor may further make the directivity of the plurality of microphones be an 8-like shape by processing the first initial sound signal and the second initial sound signal. In some embodiments, the 8-like shape has a first axis S1 and a second axis S2, and the direction of the first axis S1 is the direction in which the plurality of microphones are least (or zero) sensitive to the sound signals in the directivity of the 8-like shape, the direction of the second axis S2 is the direction in which the plurality of microphones are most sensitive to the sound signals in the directivity of the 8-like shape. In some embodiments, the speaker is located on or near the first axis S1. In some embodiments, the speaker is located on or near the second axis S2.

Figure 3A:
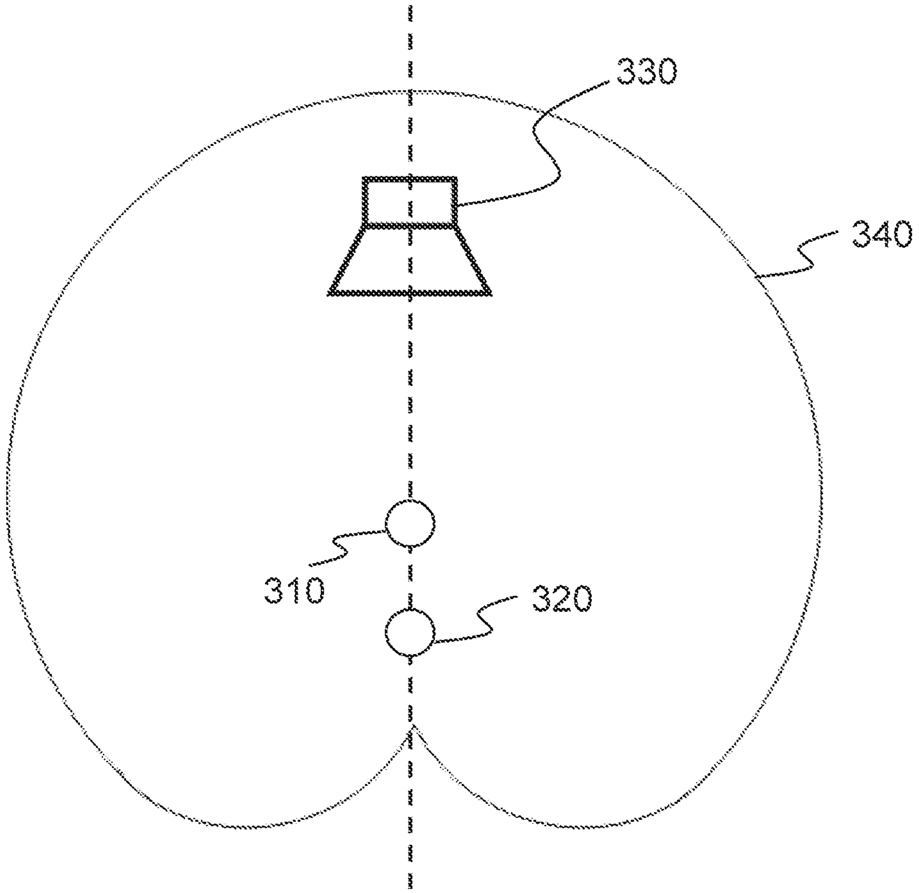
FIG. 3A is a schematic diagram illustrating a directivity of a plurality of microphones according to some embodiments of the present disclosure.
Figure 3B:
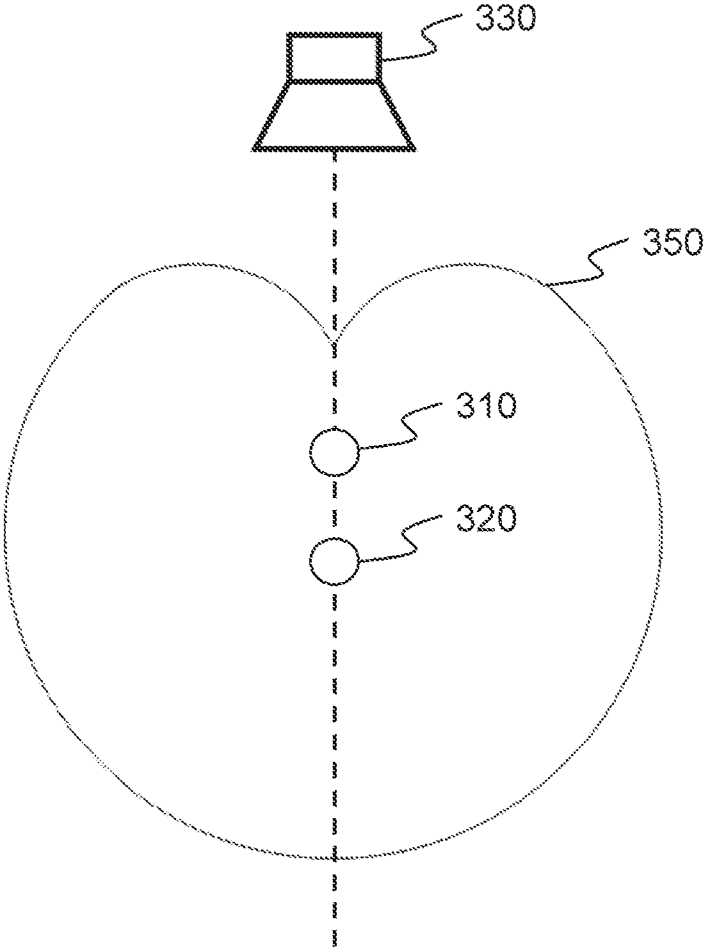
FIG. 3B is a schematic diagram illustrating a directivity of a plurality of microphones according to some other embodiments of the present disclosure.

In some embodiments, referring to FIGS. 3A-3B, the first microphone 310 and the second microphone 320 may be located on a symmetry axis of the heart-like shape. The symmetry axis of the heart-like shape refers to a straight line along which a portion of the heart-like shape is folded and can coincide with the remaining portion of the heart-like shape. For example, the symmetry axis of the heart-like shape refers to the dashed lines as shown in FIGS. 3A-3B. In other embodiments, referring to FIG. 3C, the first microphone 310 and the second microphone 320 may be located on the second axis S2 of the 8-like shape. In some embodiments, referring to FIG. 3D, the first microphone 310 and the second microphone 320 may be located on the first axis S1 of the 8-like shape. For more details about the directivity shapes (such as the heart-like shape and the 8-like shape) of the plurality of microphones, please refer to the descriptions of FIG. 3A-FIG. 3D in the present disclosure. In some embodiments, when the first microphone 310, the second microphone 320 and the speaker 330 are located on the same straight line (see FIG. 2B), or, the angle between the line connecting the first microphone 310 and the line connecting the second microphone 320 and the speaker 330 is less than a preset threshold (e.g., 30°, see FIG. 2A), the directivity of the plurality of microphones may be a heart-like shape. The heart-like shape may be disposed referring to FIG. 3A or FIG. 3B. In some embodiments, when the speaker 330 is disposed on the midperpendicular line of the line connecting the first microphone 310 and the second microphone 320 (see FIG. 2C-FIG. 2D), the directivity of the plurality of microphones may be the 8-like shape. The 8-like shape may be disposed referring to FIG. 3C or FIG. 3D.

FIG. 3A is a schematic diagram illustrating a heart-like shape according to some embodiments of the present disclosure.

In some embodiments, as shown in FIG. 3A, a directivity of an initial sound signal received by a plurality of microphones may be a first heart-like shape 340, and the first microphone 310 and the second microphone 320 may be located on a symmetry axis of the first heart-like shape 340. In some embodiments, a pole of the first heart-like shape 340 may face toward the speaker 330, and a zero point of the first heart-like shape 340 may face away from the speaker 330. In some embodiments, the pole refers to a convex point on the heart-like shape opposite to a concave point along the direction of the symmetry axis of the heart-like shape, and the pole corresponds to a direction where the sensitivity of the microphone to the sound signal is the highest. The zero point refers to the concave point of the heart-like shape. The zero point corresponds to the direction where the sensitivity of the microphone to the sound signal is the lowest.

In this way, a sound intensity from the direction of the speaker in the initial sound signal collected by the plurality of microphones (namely the first microphone and the second microphone) is always greater than the sound intensity from other directions in the environment. The processor may extract a hearing aid sound signal from the speaker in the initial sound signal, and then a portion of the hearing aid sound signal corresponding to the speaker may be subtracted from the electrical signal corresponding to the sound signal obtained by any one or both of the first microphone or the second microphone (such as the first initial sound signal, the second initial sound signal, or the initial sound signal) by the processor. That is, the electrical signal corresponding to the sound signal from other directions in the environment may be obtained. Based on the electrical signal corresponding to the sound signal from other directions in the environment, a control signal may be generated to avoid an occurrence of a howling.

FIG. 3B is a schematic diagram illustrating a heart-like shape according to some other embodiments of the present disclosure.

In some embodiments, as shown in FIG. 3B, a directivity of an initial sound signal received by the plurality of microphones may be a second heart-like shape 350, and the first microphone 310 and the second microphone 320 are located on the symmetry axis of the second heart-like shape 350. In some embodiments, a zero point of the second heart-like shape 350 faces toward the speaker 330, and a pole of the second heart-like shape 350 faces away from the speaker 330.

In this way, a sound intensity from the direction of the speaker in the initial sound signal collected by the plurality of microphones (that is, the first microphone and the second microphone) may be always less than the sound intensity from other directions in the environment. The first microphone and the second microphone may collect the sound signal from directions in the environment other than the direction of the speaker as much as possible. The first microphone and the second microphone may collect as little or no hearing aid sound signal from the speaker as possible, and generate a control signal based on an electrical signal corresponding to the sound signal in other directions in the environment, so as to avoid an occurrence of a howling.

Figure 3C:
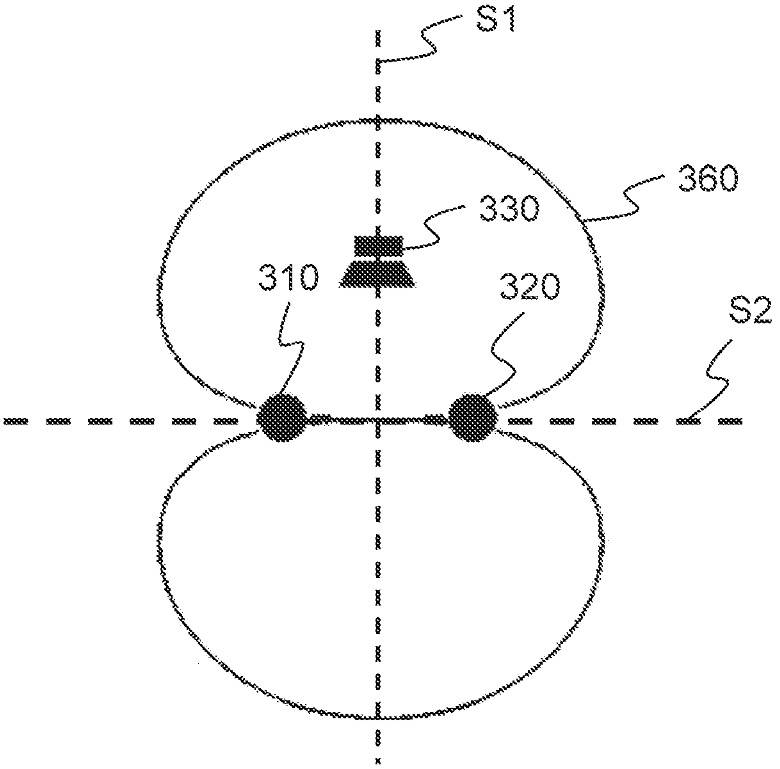
FIG. 3C is a schematic diagram illustrating a directivity of a plurality of microphones according to some other embodiments of the present disclosure.

FIG. 3C is a schematic diagram illustrating an 8-like shape according to some other embodiments of the present disclosure.

In some embodiments, as shown in FIG. 3C, a directivity of an initial sound signal received by a plurality of microphones may be a first 8-like shape 360, and the first axis S1 of the first 8-like shape 360 may be consistent with a midperpendicular line of the line connecting the microphone 310 and the second microphone 320, so that the speaker 330 is located in a direction of the first axis S1.

In this way, a sound intensity from a direction of the speaker in an initial sound signal is always greater than a sound intensity of a second sound signal from other directions around.

Figure 3D:
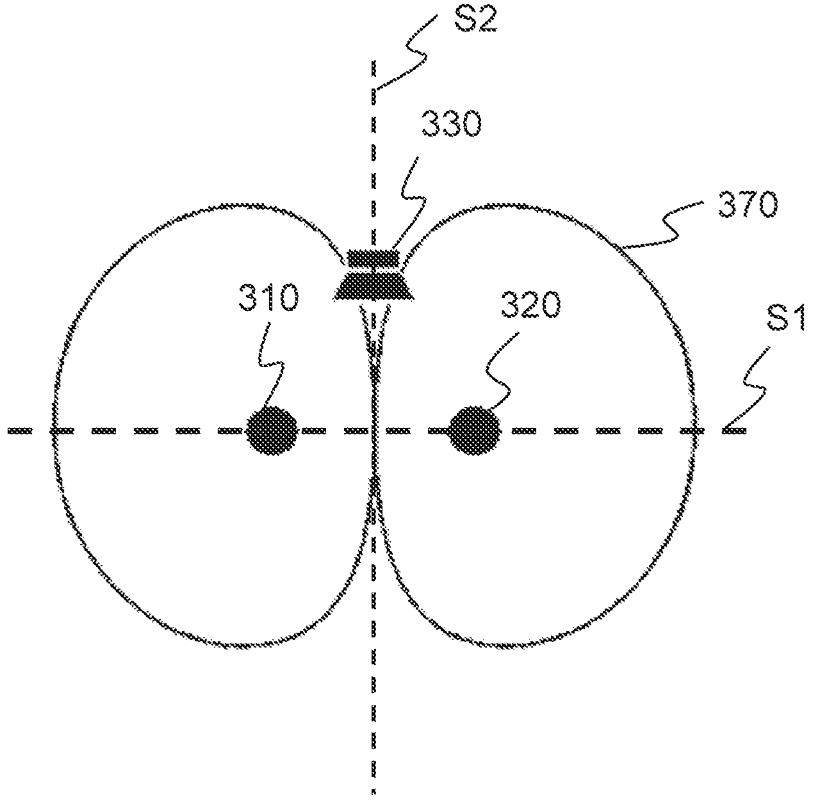
FIG. 3D is a schematic diagram illustrating a directivity of a plurality of microphones according to some other embodiments of the present disclosure.

FIG. 3D is a schematic diagram illustrating an 8-like shape according to some other embodiments of the present disclosure.

In some embodiments, as shown in FIG. 3D, a directivity of an initial sound signal received by a plurality of microphones may be a second 8-like shape 370, and the second axis S2 of the second 8-like shape 370 may be consistent with a midperpendicular line of the line connecting the microphone 310 and the second microphone 320, so that the speaker 330 is located in a direction of the second axis S2.

In this way, a sound intensity from the direction of the speaker in the initial sound signal collected by the plurality of microphones (that is, the first microphone and the second microphone) may be always less than the sound intensity from other directions in the environment.

In some alternative embodiments, the first microphone 310 may receive a first initial sound signal, the second microphone 320 may receive a second initial sound signal, and a processor may determine the sound signal of the speaker based on a difference of hearing aid signals in the first initial signal and the second initial signal. In some embodiments, the first microphone and the second microphone may include an omnidirectional microphone. In some embodiments, the hearing aid sound signal emitted by the speaker 330 may be regarded as a near-field sound signal for the first microphone and the second microphone. As the distance between the first microphone and the speaker is different from a distance between the second microphone and the speaker, the hearing aid sound signal in the first initial sound signal and the second initial sound signal may have a certain difference. Therefore, a proportion of the hearing aid sound signal in the first initial sound signal may be different from a proportion of the hearing aid sound signal in the second initial sound signal. In some embodiments, the distance between any one of the first microphone and the second microphone and the speaker is no more than 500 mm. In some embodiments, the distance between any one of the first microphone and the second microphone and the speaker is no more than 400 mm. In some embodiments, the distance between the first microphone and the speaker may be no more than 300 mm. In some embodiments, and the distance between the second microphone and the speaker may be no more than 300 mm. The processor 120 may determine the sound signal from a near field (that is, the hearing aid sound signal emitted by the speaker) and the sound signal from a far field (that is, the sound signal in the environment other than the hearing aid sound signal) based on the different hearing aid sound signals contained in the first initial sound signal and the second initial sound signal. For more contents on the mode, please refer to the descriptions in FIG. 4 of the present disclosure.

In some embodiments, the first microphone 310 and the second microphone 320 may include at least one directional microphone, and a directivity of the at least one directional microphone presents a heart-like shape. As a result, a sound intensity of the sound signal from the direction of the speaker in the in the sound signal obtained by the at least one directional microphone is always greater than or always less than a sound intensity from other directions around, so that the directional microphone may obtain the sound from the speaker or the sound from other directions in the environment other than the direction of the speaker.

By way of example only, the first microphone may be the directional microphone. In some embodiments, a pole of the heart-like shape of the first microphone faces the speaker 330, and a zero point of the heart-like shape faces away from the speaker 330, so that the first initial sound signal collected by the first microphone is mainly the sound signal from the speaker (i.e. the hearing aid sound signal). In some embodiments, the second microphone may be the omnidirectional microphone, and the processor 120 may subtract the first initial sound signal from the second initial sound signal obtained by the second microphone (it may be approximately considered that the first initial sound signal only includes the sound signal from the speaker) to obtain the sound from directions in the environment other than the direction of the speaker.

In some embodiments, in order to further improve an accuracy of the sound obtained from directions other than the direction of the speaker in the environment, the second microphone 320 may also be the directional microphone. In some embodiments, a directivity of the second microphone 320 may be opposite to that of the first microphone 310. That is, the pole of the heart-like shape of the second microphone is away from the speaker 330, and the zero point is toward the speaker 330. As a sensitivity of the directional microphone to the sound signal in different directions is affected by the accuracy of the microphone, when the speaker is close to the second microphone, the second microphone may still collect a small amount of sound signals from the speaker. Therefore, the processor 120 may be further configured to subtract the first initial sound signal from the second initial sound signal obtained by the second microphone (it can be approximately considered that the first initial sound signal only includes the sound signal from the speaker), so as to obtain the sound from directions in the environment other than the direction of the speaker. In some embodiments, the processor may further directly use the sound signal collected by the second microphone as the initial sound signal. As the second microphone has the directivity, the hearing-aid sound signal included in the initial sound signal is very little, which may be filtered out later by means of filtering, etc. In this way, a calculation amount may be reduced, thereby reliving a burden of the processor.

It should be noted that the above-mentioned disposing modes of the first microphone and the second microphone are interchangeable. For example, the first microphone 310 may be the omnidirectional microphone, and the second microphone 320 may be the directional microphone. For another example, the first microphone and the second microphone may be directional microphones, the pole of the heart-like shape of the first microphone is away from the speaker 330, the zero point faces towards the speaker 330, and the pole of the heart-like shape of the second microphone faces towards the speaker. The zero point is away from the speaker.

In some embodiments, there may be only one microphone, and the microphone may be a directional microphone. In some embodiments, the directivity of the directional microphone may be the heart-like shape, so that in the sound signal obtained by the directional microphone, the sound intensity from the speaker direction is always less than the sound intensity from other directions in the environment.

In some embodiments, by disposing positions of the speaker and the directional microphone and a distance between the speaker and the directional microphone, the directional microphone may collect more sound signals from directions other than the direction of the speaker in the environment, and collect less or no sound signal from the speaker, so as to avoid an occurrence of a howling. In some embodiments, the heart-like shape of the directional microphone may be disposed with the zero point facing the speaker and the pole away from the speaker, so that the directional microphone collects less or no sound signal from the speaker. In some embodiments, the distance between the speaker and the directional microphone may be further disposed to be in a range of 5 mm to 70 mm. In some embodiments, the distance between the speaker and the directional microphone may be in the range of 10 mm to 60 mm. In some embodiments, the distance between the speaker and the directional microphone may be in the range of 30 mm to 40 mm.

Figure 4:
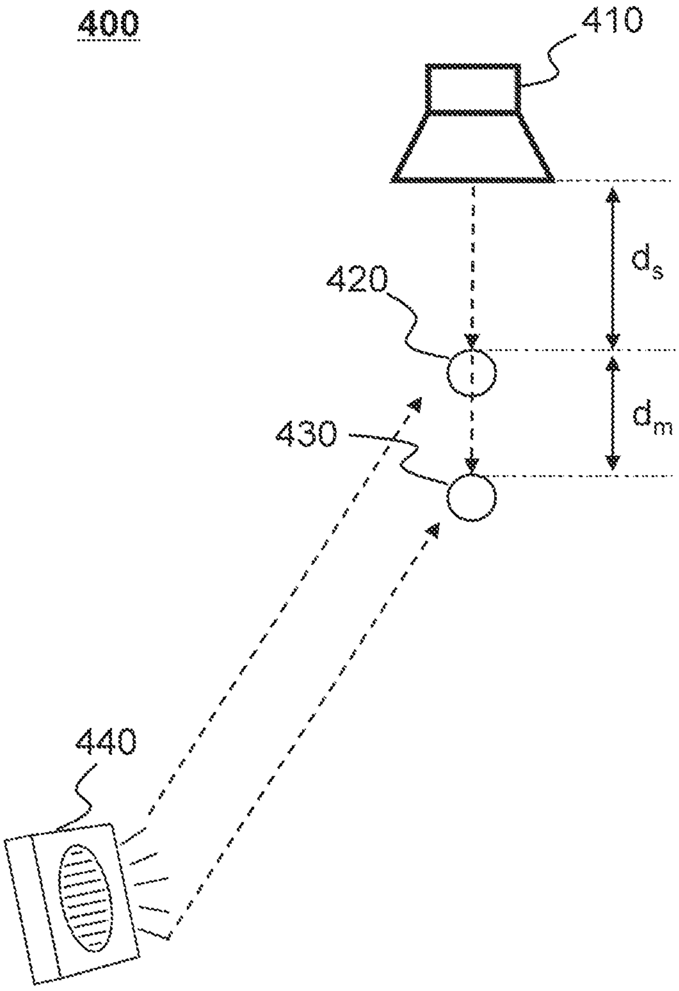
FIG. 4 is a schematic diagram illustrating a positional relationship between a microphone, a speaker, and an external sound source according to some embodiments of the present disclosure.

FIG. 4 is a schematic diagram illustrating a positional relationship between a microphone, a speaker, and an external sound source according to some embodiments of the present disclosure.

FIG. 4 shows a speaker 410, a first microphone 420, a second microphone 430, and an external sound source 440 of a hearing aid 400. A distance between the speaker 410 and the first microphone 420 and a distance between the speaker 410 and the second microphone 430 are much less than a distance between the external sound source 440 and the first microphone 420 and a distance between the external sound source 440 and the second microphone 430. Based on near-field acoustics and far-field acoustics, a sound field formed by the speaker 410 at the first microphone 420 and the second microphone 430 may be regarded as a near-field model, and the sound field formed by the external sound source 440 at the first microphone 420 and the second microphone 430 may be regarded as a far-field model.

In the near-field model, when the sound signal (that is, a hearing aid sound signal) emitted by the speaker 410 reaches the first microphone 420 and the second microphone 430, as the distances between the speaker 410 and the first microphone 420 is different from the distance between the speaker 410 and the second microphone 420, a difference between the two distances makes amplitudes of the hearing aid sound signals received by the first microphone 420 and the second microphone 430 different. That is, the sound signal emitted by the speaker 410 included in the initial sound signals received by the first microphone 420 and the second microphone 430 may be considered to be different.

In the far-field model, as the external sound source 440 is far away from the first microphone 420 and the second microphone 430, although the distance between the external sound source 440 and the first microphone 420 and the distance between the external sound source 440 and the second microphone 430 are also different, an amplitude change of the sound signal of the external sound source 440 received by the first microphone 420 and the second microphone 430 produced by the difference of two distances is very small. Therefore, the sound signal emitted by the external sound source 440 included in the initial sound signal received by the first microphone 420 and the second microphone 430 may be considered to be the same In some embodiments, the first initial sound signal obtained by the first microphone 420 may include a sound signal N1 from the speaker 410 (that is, the hearing aid sound signal) and a sound signal S from the external sound source 440. The second initial sound signal obtained by the second microphone 430 may include a sound signal N2 from the speaker 410 (i.e., the hearing aid sound signal) and the sound signal S from the external sound source 440. In some embodiments, the processor may determine the sound signal from the far field (such as the sound signal from the external sound source) other than the near-field sound signal (such as the hearing aid sound signal from the speakers) in the environment based on the different hearing aid sound signals contained in the first initial sound signal and the second initial sound signal.

In some embodiments, the distance between the first microphone 420 and the second microphone 430 is indicated as $d_m$, the distance between the first microphone 420 and the speaker 410 is indicated as $d_s$, then a ratio of the distance between the first microphone 420 and the speaker to the distance between the second microphone 430 and the speaker is:

$$\eta = \frac{d_s}{d_s + d_m}, \tag{1}$$

where, $0<\eta<1$. When the positions of the first microphone 420, the second microphone 430, and the speaker 410 are determined, a value of $\eta$ may be determined.

Sound waves propagated from the speaker 410 to the first microphone 420 and the second microphone 430 are approximately spherical waves, and sound waves propagated from the external sound source 440 to the first microphone 420 and the second microphone 430 are approximately far-field plane wave. Then the first initial sound signal and the second initial sound signal received by the first microphone 420 and the second microphone 430 are transformed into a frequency domain, and a signal average power of each frequency domain sub-band may be approximately expressed as:

$$\begin{cases} Y_1^2 = S^2 + N^2 \\ Y_2^2 = S^2 + \eta^2 N^2 \end{cases}, \quad (2)$$

where, $Y_1$ indicates the signal average power of each frequency domain sub-band corresponding to the first initial sound signal, $Y_2$ indicates the signal average power of each frequency domain sub-band corresponding to the second initial sound signal, and S indicates a domain expression of the sound signal from the external sound source 440 in the initial sound signal, N indicates the domain expression of the sound signal from the speaker 410 in the first initial sound signal.

According to formula 2:

$$S = \sqrt{\frac{Y_2^2 - \eta^2 Y_1^2}{1 - \eta^2}}, \quad (3)$$

That is to say, by measuring the signal average power of each frequency domain sub-band of the first initial sound signal and the second initial sound signal, the frequency domain expression of the sound signal S from the external sound source 440 in the initial sound signal may be calculated. In some embodiments, the processor 120 may perform an inverse Fourier transform on the S to transform it into the time domain, so as to obtain the sound signal from the external sound source 440 in the initial sound signal. In this way, the hearing aid sound signal in the initial sound signal may be eliminated, and the howling of the hearing aid 400 may be avoided.

As described in the embodiment of the present disclosure, the processor 120 may perform a phase modulation or an amplitude modulation processing on the initial sound signal (such as the first initial sound signal and the second initial sound signal) by adjusting the directivity of the plurality of microphones. Then the hearing aid sound signal in the initial sound signal may be eliminated through performing a subtraction operation. The processor may further eliminate the hearing aid sound signal in the initial sound signal by processing the near-field model and the far-field model. In some embodiments, the processor may further use the above two modes at the same time to eliminate the hearing aid sound signal in the initial sound signal.

In some embodiments, the processor 120 may obtain two different processing results of the initial sound signal by adjusting the directivity of the plurality of microphones and using the processing modes of the near-field model and the far-field model. After that, the processor may combine (e.g., a signal superposition, a weighted combination, etc.) the two signals obtained from the two different processing results, and generate a control signal based on the combined signal. As the processor eliminates the hearing aid sound signal in the initial sound signal through two different processing modes, even if there may still be a small amount of hearing aid sound signal in the two different processing results, the hearing aid sound signal may further be combined and eliminated through a subsequent processing, so as to avoid the howling of the hearing aid.

In some embodiments, the processor 120 may further preliminarily eliminate the hearing aid sound signal in the initial sound signal by adjusting the directivity of the plurality of microphones, and then further eliminate the hearing aid sound signal remained in the sound signal through the processing of the near-field model and the far-field model. In some other embodiments, the processor may initially eliminate the hearing aid sound signal in the initial sound signal through the processing of the near-field model and the far-field model, and then adjust the directivity of the plurality of microphones to perform the phase modulation or the amplitude modulation. After that, the subtraction operation is performed, so as to further eliminate the remaining hearing aid sound signal in the initial sound signal. Through two consecutive processings, the processor may eliminate the hearing aid sound signal in the initial sound signal to a greater extent, so as to prevent the hearing aid from howling.

In the actual use of the hearing aid, there may still be a small amount of hearing aid sound signals in the processed initial sound signal due to an insufficient precision of the device, resulting in an unsatisfactory de-howling. Therefore, in order to achieve a more ideal de-howling effect, in some embodiments, the hearing aid may further include a filter (such as the filter 150, also referred to as a second filter), which is configured to: feedback a portion of the electrical signal corresponding to the hearing aid sound signal to a signal processing loop to filter out the portion of the electrical signal corresponding to the hearing aid sound signal. In some embodiments, the second filter may be an adaptive filter.

Figure 5:
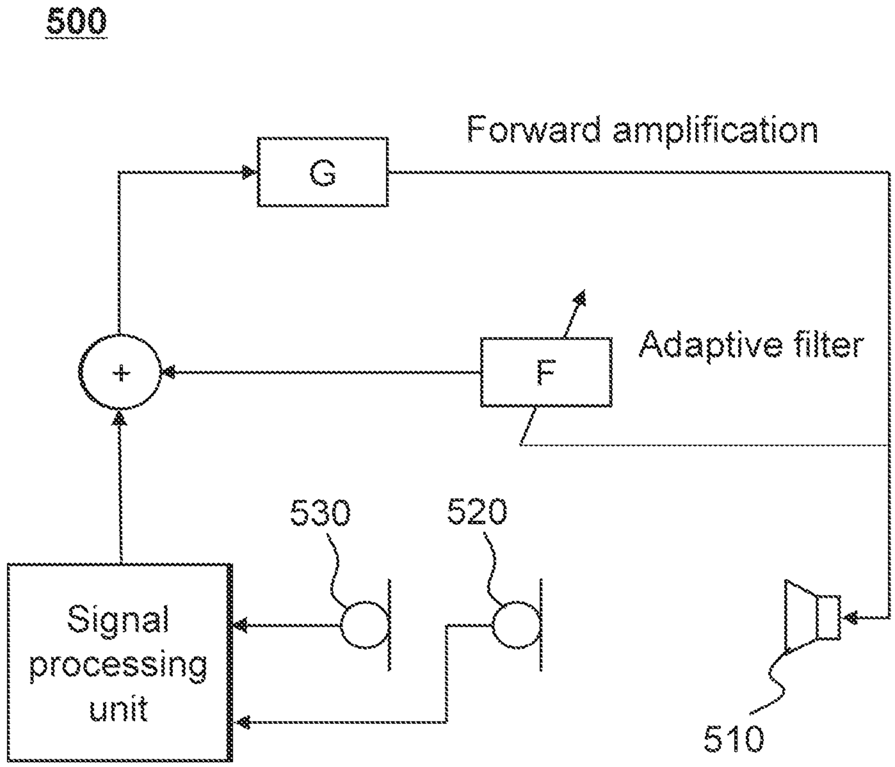
FIG. 5 is a schematic diagram illustrating a signal processing principle according to some embodiments of the present disclosure.

FIG. 5 is a schematic diagram illustrating a signal processing principle according to some embodiments of the present disclosure.

As shown in FIG. 5, a hearing aid 500 may include a speaker 510, a first microphone 520, and a second microphone 530. Electrical signals corresponding to initial sound signals collected by the first microphone 520 and the second microphone 530 may be processed by a signal processing unit (e.g., adjusting a directivity of the first microphone 520 and the second microphone 530, or processing according to the near-field model and the far-field model described in FIG. 4), so as to eliminate a portion of the electrical signal corresponding to the sound signal from the speaker (i.e., the hearing aid signal), thereby avoiding a howling. In some embodiments, a signal processing loop for processing the electrical signal corresponding to the initial sound signal may include the signal processing unit, an adder, a forward amplification unit G, and an adaptive filter F (i.e., a second filter). The electrical signal processed by the signal processing unit may be amplified by the forward amplifying unit G, and the forward amplified electrical signal may pass through the adaptive filter F (that is, the second filter) to feedback the portion corresponding to the hearing aid sound signal to the adder. As a result, the adder may take the portion of signal as reference information to further filter out the portion corresponding to the hearing aid sound signal from the electrical signal in the signal loop. By disposing the adaptive filter F, the portion of the electrical signal corresponding to the hearing aid sound signal may be further filtered out, and then the processor may generate a control signal based on the electrical signal, and transmit the control signal to the speaker 510.

In some embodiments, when the positions of the speaker 510, the first microphone 520 and the second microphone 530 are fixed, the distance between the speaker 510 and the first microphone 520 is constant, and the distance between the speaker 510 and the second microphone 530 is constant, the parameters of the adaptive filter are fixed. Therefore, the parameters of the adaptive filter may be stored in a storage device (such as a signal processing chip) after being determined, and may be directly used in the processor 120. In some embodiments, the parameters of the adaptive filter are variable. In a process of noise elimination, the adaptive filter may adjust the parameters thereof according to the signal received by the microphone, so as to implement the noise elimination.

FIG. 6A is a schematic structural diagram illustrating an air conduction microphone 610 according to some embodiments of the present disclosure. In some embodiments, the air conduction microphone 610 (e.g., the first microphone and/or the second microphone) may be a Micro-electromechanical system (MEMS) microphone. The MEMS microphone has features of a small size, a low power consumption, a high stability, a good consistent amplitude-frequency, and a phase-frequency response. As shown in FIG. 6A, the air conduction microphone 610 includes a hole 611, a shell 612, an application specific integrated circuit (ASIC) 613, a printed circuit board (PCB) 614, a front cavity 615, a diaphragm 616 and a rear cavity 617. The hole 611 is disposed on one side of the shell 612 (the upper side in FIG. 6A, i.e., the top). The ASIC 613 is mounted on the PCB 614. The front cavity 615 and the rear cavity 617 are separated and formed by the diaphragm 616. As shown in the figure, the front cavity 615 includes a space above the diaphragm 616, and is formed by the diaphragm 616 and shell 612. The rear cavity 617 includes a space below the diaphragm 616 and is formed by the diaphragm 616 and the PCB 614. In some embodiments, when the air conduction microphone 610 is placed in the hearing aid, an air conduction sound in the environment (e.g., a user's voice) may enter the front cavity 615 through the hole 611 and cause the diaphragm 616 to vibrate. At the same time, the vibration signal generated by a speaker may cause the shell 612 of the air conduction microphone 610 to vibrate through a supporting structure of the hearing aid, and then drive the vibration of the diaphragm 616 to generate a vibration noise signal.

In some embodiments, the air conduction microphone 610 may be replaced by a mode in which the rear cavity 617 is opened and the front cavity 615 is isolated from outside air.

In some embodiments, when the speaker is a bone conduction speaker, the hearing aid signal may include a bone conduction sound wave and a second air conduction sound wave. In some embodiments, the processor may eliminate the hearing aid sound signal corresponding to the second air conduction sound wave in the initial sound signal by adjusting a directivity of a plurality of microphones, or by processing a near-field model and a far-field model. Regarding the processing mode of adjusting the directivity of the plurality of microphones, and the processing mode of using the near-field model and the far-field model, please refer to the descriptions elsewhere in the present disclosure, which is not repeated here. In some embodiments, the processor may further process the vibration signal corresponding to the bone conduction sound wave to eliminate the hearing aid sound signal corresponding to the bone conduction sound wave in the initial sound signal. Therefore, in some embodiments, the hearing aid may pick up the vibration signal received by the microphone (such as the microphone 610) by setting a vibration sensor. In some embodiments, in order to make an amplitude frequency response/a phase frequency response of the vibration sensor and the microphone on the vibration as consistent as possible, the vibration sensor and the microphone may be connected in the same way (e.g., one of a cantilever connection, a base connection, a surrounding connection) to the cavity of the supporting structure of the hearing aid, and dispensing positions of the vibration sensor and the microphone may be kept the same or as close as possible.

FIG. 6B is a schematic structural diagram illustrating a vibration sensor 620 according to some embodiments of the present disclosure. As shown in the figure, the vibration sensor 620 includes a shell 622, an ASIC 623, a PCB 624, a front cavity 625, a diaphragm 626 and a rear cavity 627. In some embodiments, the sensor 620 may be obtained by sealing the hole 611 of the air conduction microphone in FIG. 6A. That is, the vibration sensor 620 may be referred to as a sealed microphone 620, and the front cavity 625 and the rear cavity 627 of the sealed microphone 620 are both sealed. In some embodiments, when the sealed microphone 620 is disposed in the hearing aid, the air conduction sound in the environment (e.g., the user's voice) cannot enter the sealed microphone 620 and cause the diaphragm 626 to vibrate. The vibration generated by a vibrating speaker causes the shell 622 of the sealed microphone 620 to vibrate through an earphone shell and a connection structure, and then drives the vibration of the diaphragm 626 to generate a vibration signal.

FIG. 6C is a schematic structural diagram illustrating a vibration sensor 630 according to some other embodiments of the present disclosure. As shown, the vibration sensor 630 includes a hole 631, a shell 632, an ASIC 633, a PCB 634, a front cavity 635, a diaphragm 636, a rear cavity 637 and a hole 638. In some embodiments, the vibration sensor 630 may be obtained by punching a hole at a bottom of the rear cavity 637 of the air conduction microphone in FIG. 6A to make the rear cavity 637 communicate with the outside. That is, the vibration sensor 630 may be referred to as a dual-communication microphone 630, and the front cavity 635 and the rear cavity 637 of the vibration sensor 630 are both provided with holes. In some embodiments, when the dual-communication microphone 630 is disposed in the hearing aid, the air conduction sound in the environment (e.g., the user's voice) enters the dual-communication microphone 630 through the hole 631 and the hole 638 respectively, so that the air conduction sound signals received on both sides of the diaphragm 636 cancel each other out. Therefore, the air conduction sound signal cannot cause an obvious vibration of the diaphragm 636. The vibration generated by the vibrating speaker causes the shell 632 of the dual-communication microphone 630 to vibrate through the supporting structure of the hearing aid, and then drives the vibration of the diaphragm 636 to generate the vibration signal.

For a more specific descriptions of the vibration sensor (such as the vibration sensor 620, the vibration sensor 630), please refer to the International Application No. PCT/CN2018/083103 titled "Device and method of removing vibration for dual-microphone earphone", the contents of which are entirely incorporated herein by reference.

The above descriptions of the air conduction microphone and the vibration sensor are only a specific example and should not be considered as the only possible implementation. Obviously, for those skilled in the art, after understanding the basic principle of the microphone, various amendments and changes may be made to the specific structure of the microphone and/or the vibration sensor without departing from this principle, but these amendments and changes are still within the scope of the above description. For example, for those skilled in the art, the hole 611 or 631 in the air conduction microphone 610 or the vibration sensor 630 may be disposed on a left side or a right side of the shell 612 or the shell 632, as long as the hole may communicate the front cavity 615 or 635 with the outside world. Furthermore, a number of holes is not limited to one, and the air conduction microphone 610 or the vibration sensor 630 may include a plurality of holes similar to the hole 611 or 631.

In some embodiments, after the vibration signal of the microphone is obtained by the vibration sensor, the processor may eliminate the vibration signal from the initial sound signal by means of filtering, etc., so as to prevent the vibration signal from affecting the subsequent processing of the initial sound signal by the processor.

The basic concept has been described above, obviously, for those skilled in the art, the above detailed disclosure is only an example, and does not constitute a limitation to the present disclosure. Although not explicitly stated here, those skilled in the art may make various modifications, improvements, and amendments to the present disclosure. These modifications, improvements and amendments are intended to be suggested by the present disclosure, and are within the spirit and scope of the exemplary embodiments of the present disclosure.

Moreover, certain terminology has been used to describe embodiments of the present disclosure. For example, "one embodiment," "an embodiment," and/or "some embodiments" refer to a certain feature, structure or characteristic related to at least one embodiment of the present disclosure. Therefore, it should be emphasized and noted that two or more references to "an embodiment," or "one embodiment," or "an alternative embodiment" in different places in the present disclosure do not necessarily refer to the same embodiment. In addition, some features, structures, or characteristics in one or more embodiments of the present disclosure may be appropriately combined.

In addition, those skilled in the art may understand that various aspects of the present disclosure may be illustrated and described in several patentable categories or circumstances, including any new and useful process, machine, product or combination of substances, or any combination thereof, and any new and useful improvements. Accordingly, all aspects of the present disclosure may be performed entirely by hardware, may be performed entirely by software (including firmware, resident software, microcode, etc.), or may be performed by a combination of hardware and software. The above hardware or software may be referred to as "data block," "module," "engine," "unit," "component," or "system". In addition, aspects of the present disclosure may appear as a computer product located in one or more computer-readable media, the product including computer-readable program code.

A computer storage medium may contain a propagated data signal with a computer program code, for example, in a baseband or as portion of a carrier wave. The propagated data signal may have various manifestations, including an electromagnetic form, an optical form, etc., or a suitable combination. A computer storage medium may be any computer-readable medium, other than a computer-readable storage medium that can be used to communicate, propagate, or transfer a program for use by being coupled to an instruction execution system, apparatus, or device. Program code residing on a computer storage medium may be transmitted over any suitable medium, including a radio, an electrical cable, a fiber optic cable, a radio frequency (RF), etc., or combinations of any of the foregoing.

The computer program codes required for the operation of each portion of the present disclosure may be written in any one or more programming languages, including object-oriented programming languages such as Java, Scala, Smalltalk, Eiffel, JADE, Emerald, C++, C#, VB.NET, Python etc., conventional procedural programming languages such as C language, Visual Basic, Fortran 2003, Perl, COBOL 2002, PHP, ABAP, dynamic programming languages such as Python, Ruby and Groovy, or other programming languages, etc. The program code may run entirely on the user's computer, or as a stand-alone software package, or run partially on the user's computer and partly on a remote computer, or entirely on the remote computer or server. In the latter case, the remote computer may be connected to the user computer through any form of network, such as a local area network (LAN) or wide area network (WAN), or to an external computer (such as through the Internet), or in a cloud computing environment, or as a service use, such as software as a service (SaaS).

In addition, the order of processing elements and sequences described in the present disclosure, the use of numbers and letters, or the use of other names are not used to limit the order of the process and methods of the present disclosure unless explicitly stated in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, numbers describing the quantity of components and attributes are used. It should be understood that such numbers used in the description of the embodiments use the modifiers "about," "approximately," or "substantially" to modify in some embodiments. Unless otherwise stated, the "about," "approximately," or "substantially" indicates that the stated figure allows for a variation of ±20%. Accordingly, in some embodiments, the numerical parameters used in the present disclosure and claims are approximations that can vary depending upon the desired characteristics of individual embodiments. In some embodiments, numerical parameters should consider the specified significant digits and adopt the general digit reservation method. Although the numerical ranges and parameters used in some embodiments of the present disclosure to confirm the breadth of the scope are approximate values, in specific embodiments, such numerical values are set as precisely as practicable.

The entire contents of each patent, patent application, patent application publication, and other material, such as article, book, specification, publication, document, etc., cited in the present disclosure are hereby incorporated by reference into the present disclosure. Application history documents that are inconsistent with or conflict with the content of the present disclosure are excluded, as are documents (currently or hereafter appended to the present disclosure) that limit the broadest scope of the claims of the present disclosure. It should be noted that if there is any inconsistency or conflict between the descriptions, definitions, and/or terms used in the attached materials of the present disclosure and the contents of the present disclosure, the descriptions, definitions and/or terms used in the present disclosure shall prevail.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A hearing aid, comprising:

a plurality of microphones configured to receive an initial sound signal and convert the initial sound signal into an electrical signal, wherein the plurality of microphones includes a first microphone and a second microphone that are spaced apart from the first microphone;

a processor configured to process the electrical signal and generate a control signal; and a speaker configured to convert the control signal into a hearing aid sound signal, wherein to process the electrical signal and generate the control signal, the processor is configured to:

adjust a directivity of the initial sound signal received by the plurality of microphones, so that a sound intensity of a first sound signal from a direction of the speaker in the initial sound signal is always greater than or always less than a sound intensity of a second sound signal from other directions around; wherein the sound intensity of the first sound signal from the direction of the speaker in the initial sound signal collected by the plurality of microphones is always greater than the sound intensity of the second sound signal from other directions in the environment, the processor is configured to:

extract the first sound signal from the speaker in the initial sound signal;

subtracted a portion of the first sound signal from a second electrical signal corresponding to a sound signal obtained by any one or both of the first microphone or the second microphone to obtain the second sound signal from other directions in the environment;

generate a control signal based on the second sound signal, the control signal being transmitted to the speaker, the control signal being converted into the hearing aid sound signal; or the sound intensity of the first sound signal from the direction of the speaker in the initial sound signal collected by the plurality of microphones is always less than the sound intensity of the second sound signal from other directions in the environment, the processor is configured to:

generate a control signal based on the second sound signal, the control signal being transmitted to the speaker, and the control signal being converted into the hearing aid sound signal.

2. The hearing aid of claim 1, further comprising:

a supporting structure configured to set up on a user's head and accommodate the speaker, so that the speaker is located near the user's ear without blocking an ear canal.

3. The hearing aid of claim 1, wherein an angle between a line connecting the first microphone and the second microphone and a line connecting the first microphone and the speaker is not greater than 30°, and the first microphone is farther away from the speaker relative to the second microphone.

4. The hearing aid of claim 1, wherein the first microphone, the second microphone and the speaker are arranged in line.

5. The hearing aid of claim 1, wherein the speaker is arranged on a midperpendicular line of a line connecting the first microphone and the second microphone.

6. The hearing aid of claim 1, wherein an adjusted directivity of the initial sound signal obtained after adjusting the directivity of the initial sound signal is a heart-like shape.

7. The hearing aid of claim 6, wherein a pole of the heart-like shape faces towards the speaker and a zero point of the heart-like shape faces away from the speaker; and/or a zero point of the heart-like shape faces towards the speaker and a pole of the heart-like shape faces away from the speaker.

8. The hearing aid of claim 1, wherein an adjusted directivity of the initial sound signal obtained after adjusting the directivity of the initial sound signal is a first 8-like shape, a first axis of the first 8-like shape is consistent with a midperpendicular line of a line connecting the first microphone and the second microphone, so that the speaker is located in a direction of the first axis, and the direction of the first axis is a direction in which the plurality of microphones are least or zero sensitive to the adjusted sound signal in the directivity of the first 8-like shape; or an adjusted directivity of the initial sound signal obtained after adjusting the directivity of the initial sound signal is a second 8-like shape, a second axis of the second 8-like shape is consistent with the midperpendicular line of the line connecting the first microphone and the second microphone, so that the speaker is located in a direction of the second axis, and the direction of the second axis is a direction in which the plurality of microphones are most sensitive to the adjusted sound signal in the directivity of the second 8-like shape.

9. The hearing aid of claim 1, wherein the first microphone receives a first initial sound signal, the second microphone receives a second initial sound signal, and a distance between the first microphone and the speaker is different from a distance between the second microphone and the speaker.

10. The hearing aid of claim 9, wherein the processor is further configured to determine, based on the distance between the first microphone and the speaker and the distance between the second microphone and the speaker, a proportional relationship of the hearing aid sound signal in the first initial sound signal and second initial sound signal.

11. The hearing aid of claim 10, wherein the processor is further configured to:

obtain a signal average power of the first initial sound signal and the second initial sound signal; and determine, based on the proportional relationship and the signal average power, the second sound signal in the initial sound signal from other directions around.

12. The hearing aid of claim 1, wherein the hearing aid further comprises a filter configured to:

feedback a portion of the electrical signal corresponding to the hearing aid sound signal to a signal processing loop to filter out the portion of the electrical signal corresponding to the hearing aid sound signal.

13. The hearing aid of claim 1, wherein the speaker comprises:

a first vibration assembly electrically connected to the processor, the first vibration assembly being configured to receive the control signal, and generate a vibration based on the control signal; and a shell coupled with the first vibration assembly, the shell being configured to transmit the vibration to the user's face.

14. The hearing aid of claim 13, wherein the hearing aid sound signal comprises: a bone conduction sound wave generated based on the vibration, and/or a second air conduction sound wave generated by the first vibration assembly and/or the shell when generating and/or transmitting the vibration.

15. The hearing aid of claim 14, wherein the hearing aid further comprises: vibration sensors configured to obtain a vibration signal of the speaker;

the processor is further configured to eliminate the vibration signal from the initial sound signal.

16. The hearing aid of claim 1, wherein the first microphone receives a first initial sound signal, the second microphone receives a second initial sound signal, and the processor is further configured to: perform a time delay processing or a phase shift processing on the first initial sound signal to obtain a first processed sound signal; perform a differential processing on the processed sound signal and the second initial sound signal to obtain a differential signal; and adjusting the differential signal, so that the sound intensity from the direction of the speaker in the initial sound signal always greater or always less than the sound intensity of the second sound signal from other directions around when receiving the initial sound signal.

17. The hearing aid of claim 6, wherein the first microphone receives a first initial sound signal, the second microphone receives a second initial sound signal, and the processor is further configured to:

convert the first initial sound signal into a first frequency domain signal, and convert the second initial sound signal into a second frequency domain signal;

determine, based on positions of the first microphone and the second microphone and/or a distance between the first microphone and the second microphone, directivity data toward the speaker and directivity data away from the speaker in the first frequency domain signal and the second frequency domain signal, so that the plurality of microphones have a directivity toward the speaker, and the directivity is a heart-like shape.

18. The hearing aid of claim 17, wherein the processor is further configured to:

perform a phase transformation on the second frequency domain signal based on sampling frequencies of the first initial sound signal and the second initial sound signal, the positions of the first microphone and the second microphone, and/or the distance between the first microphone and the second microphone, so that the second frequency domain signal have a same phase with the first frequency domain signal.

* * * * *